United States Patent
Maki et al.

(10) Patent No.: US 11,824,805 B2
(45) Date of Patent: *Nov. 21, 2023

(54) TRANSMITTER, RECEIVER, TRANSMISSION METHOD, AND RECEPTION METHOD WITH PHASE TRACKING REFERENCE SIGNAL MAPPING

(71) Applicant: Panasonic Intellectual Property Corporation of America, Torrance, CA (US)

(72) Inventors: Shotaro Maki, Tokyo (JP); Hidetoshi Suzuki, Kanagawa (JP); Ayako Horiuchi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,531

(22) Filed: Jan. 14, 2022

(65) Prior Publication Data

US 2022/0140974 A1 May 5, 2022

Related U.S. Application Data

(63) Continuation of application No. 16/499,949, filed as application No. PCT/JP2018/015668 on Apr. 16, 2018, now Pat. No. 11,258,558.

(30) Foreign Application Priority Data

Jun. 12, 2017 (JP) .................................. 2017-115103

(51) Int. Cl.
*H04L 5/00* (2006.01)

(52) U.S. Cl.
CPC .......... *H04L 5/0048* (2013.01); *H04L 5/0094* (2013.01)

(58) Field of Classification Search
CPC ... H04L 5/0048; H04L 5/0094; H04L 5/0012; H04L 5/0073; H04L 27/261; H04J 11/005; H04J 11/003
See application file for complete search history.

(56) References Cited

U.S. PATENT DOCUMENTS

| 10,735,169 B2 | 8/2020 | Kim et al. |
| 10,886,956 B2 | 1/2021 | Lee et al. |
| (Continued) | | |

FOREIGN PATENT DOCUMENTS

| IN | 201937045989 A | 1/2020 |
| JP | 2010-35154 A | 2/2010 |
| (Continued) | | |

OTHER PUBLICATIONS

The Extended European Search Report, dated Sep. 1, 2022, for European Patent Application No. 22170450.5-1203. (9 pages).

(Continued)

*Primary Examiner* — Ivan O Latorre
(74) *Attorney, Agent, or Firm* — Seed IP Law Group LLP

(57) ABSTRACT

In a transmitter, an assignment circuit maps a phase tracking reference signal (PT-RS) onto a subcarrier, and a transmitting circuit transmits a signal containing the phase tracking reference signal. The phase tracking reference signal is mapped onto a different subcarrier for each cell, group, or mobile station.

13 Claims, 11 Drawing Sheets

(56) References Cited

U.S. PATENT DOCUMENTS

| | | | |
|---|---|---|---|
| 10,998,994 | B2 | 5/2021 | Lee et al. |
| 11,147,091 | B2 | 10/2021 | Yokomakura et al. |
| 2010/0189032 | A1 | 7/2010 | Chen et al. |
| 2011/0007778 | A1 | 1/2011 | Kishiyama et al. |
| 2011/0075703 | A1 | 3/2011 | Jiang et al. |
| 2018/0183491 | A1* | 6/2018 | Takeda .................. H04B 1/713 |
| 2018/0205528 | A1 | 7/2018 | Bai et al. |
| 2018/0351719 | A1 | 12/2018 | Lee et al. |
| 2018/0359071 | A1 | 12/2018 | Lee et al. |
| 2019/0081844 | A1 | 3/2019 | Lee et al. |
| 2019/0097776 | A1 | 3/2019 | Kim et al. |
| 2019/0312697 | A1 | 10/2019 | Li et al. |
| 2019/0326964 | A1 | 10/2019 | Li et al. |
| 2020/0008102 | A1* | 1/2020 | Yokomakura ......... H04L 5/0048 |
| 2020/0008228 | A1* | 1/2020 | Lee ....................... H04W 72/21 |
| 2020/0052740 | A1 | 2/2020 | Zhang et al. |
| 2020/0052930 | A1* | 2/2020 | Kim .................... H04L 25/0224 |
| 2020/0067676 | A1 | 2/2020 | Yi |
| 2020/0119882 | A1 | 4/2020 | Zhang et al. |
| 2020/0196332 | A1* | 6/2020 | Yokomakura ......... H04L 5/0048 |
| 2020/0204335 | A1 | 6/2020 | Kim et al. |
| 2020/0287751 | A1 | 9/2020 | Lee et al. |
| 2021/0075453 | A1 | 3/2021 | Lee et al. |
| 2021/0076389 | A1* | 3/2021 | Zhang ................. H04L 27/2694 |
| 2022/0038320 | A1 | 2/2022 | Zhang et al. |

FOREIGN PATENT DOCUMENTS

| | | |
|---|---|---|
| WO | 2017/200315 A1 | 11/2017 |
| WO | 2018/027222 A1 | 2/2018 |

OTHER PUBLICATIONS

Ericsson, "On DL PTRS design", R1-1708707, Agenda Item: 7.1.2.4.3, 3GPP TSG-RAN WG1 #89, Hanzhou, China, May 15-19, 2017, Retrieved from the Internet: URL:http://www.3gpp.org/ftp/tsg_ran/WG1_RL1/TSGR1_89/Docs/ [retrieved on May 6, 2017]. (4 pages).

Xinwei, "Evaluation and Discussion on DL Phase Tracking RS Design", R1-1707088, Agenda Item: 7.1.2.4.3, 3GPP TSG-RAN WG1 #89, Hangzhou, China, May 15-19, 2017, Retrieved from the Internet: URL:http://www.3gpp.org/ftp/tsg_ran/WG1_RL1/TSGR1_89/Docs/ [retrieved on May 5, 2017]. (6 pages).

Kim et al., "Signaling Method for Multiple DMRS Configuration," Certified priority document, U.S. Appl. No. 62/517,210, filed Jun. 9, 2017, and issued Mar. 22, 2018, 46 pages.

Lee et al., "Reference Signal Design for Wireless Communication Systems," Certified priority document, U.S. Appl. No. 62/556,146, filed Sep. 8, 2017, and issued May 1, 2019, 287 pages.

LG Electronics, "Discussion on Phase Tracking RS for UL," R1-1700485, Agenda item: 5.1.2.3.3, 3GPP TSG RAN WG1 NR ad-hoc, Spokane, USA, Jan. 16-20, 2017, 7 pages.

LG Electronics, "On DL PT-RS design," R1-1704890, Agenda item: 8.1.2.4.3, 3GPP TSG RAN WGI Meeting #88bis, Spokane, USA, Apr. 3-7, 2017, 3 pages.

Nokia, Alcatel-Lucent Shanghai Bell, "On RS Design for Phase Tracking in NR, " R1-1612860, Agenda item: 8.1.4.4, 3GPP TSG-RAN WG1 #87, Reno, USA, Nov. 14-18, 2016, 11 pages.

Qi et al., "On the Phase Tracking Reference Signal (PT-RS) Design for 5G New Radio (NR)," 2018 IEEE 88th Vehicular Technology Conference (VTC-Fall), Chicago, Illinois, USA, Aug. 27-30, 2018, 5 pages.

Zheng et al., "Phase Noise Compensation for DFT-s-OFDM Waveforms in MIMO System," 2018 IEEE 4th International Conference on Computer and Communications, Chengdu, China, Dec. 7-10, 2018, pp. 430-434.

International Search Report, dated Jun. 26, 2018, for International Application No. PCT/JP2018/015668. (2 pages).

Ericsson, "On phase noise effects," R1-1612335, Agenda Item: 7.1.3.2, 3GPP TSG-RAN WG1 #87, Reno, Nevada, Nov. 14-18, 2016. (6 pages).

National Instruments, "Discussion on Signaling for PT-RS," R1-1705253, Agenda Item: 8.1.2.4.3, 3GPP TSG RAN WG1 Meeting #88bis, Spokane, USA, Apr. 3-7, 2017. (10 pages).

NTT DOCOMO, "Revision of SI: Study on New Radio Access Technology," RP-161596, Agenda Item: 9.2.2, 3GPP TSG RAN Meeting #73, New Orleans, Sep. 19-22, 2016. (7 pages).

* cited by examiner

TRANSMITTER, RECEIVER, TRANSMISSION METHOD, AND RECEPTION METHOD WITH PHASE TRACKING REFERENCE SIGNAL MAPPING

TECHNICAL FIELD

The present disclosure relates to a transmitter, a receiver, a transmission method, and a reception method.

BACKGROUND ART

A communication system called "fifth-generation mobile communication system (5G)" has been under consideration. In 5G, flexible provision of a function to each of various use cases where an increase in communication traffic, an increase in the number of terminals to be connected, high reliability, low latency, and the like are needed has been under consideration. There are three typical use cases: enhanced Mobile Broadband (eMBB), Massive Machin Type Communications (mMTC), and Ultra Reliable and Low Latency Communications (URLLC). In 3GPP (3rd Generation Partnership Project), which is an international standardization organization, sophistication of communication systems has been under consideration from the embodiment of both sophistication of LTE systems and New RAT (Radio Access Technology) (see, for example, NPL 1).

CITATION LIST

Non Patent Literature

NPL 1: RP-161596, "Revision of SI: Study on New Radio Access Technology", NTT DOCOMO, September 2016
NPL 2: R1-1612335, "On phase noise effects", Ericsson, November 2016

SUMMARY OF INVENTION

In New RAT, as compared with LTE/LTE-Advanced, signals of high frequencies of, for example, 6 GHz or higher are utilized as carrier waves. In particular, in a case where a high frequency band and a higher-order modulation multi-valued number (modulation order) are used, error rate characteristics deteriorate due to a CPE (common-phase error) or ICI (inter-carrier interference) that occurs due to the phase noise of a local oscillator of a transmitter (see, for example, NPL 2). To address this problem, New RAT has given consideration to a receiver's performing a CPE correction or ICI correction (hereinafter sometimes referred to as "CPE/ICI correction") by means of a phase tracking reference signal (PT-RS) in addition to performing channel equalization.

However, no close consideration has been given to a method for suppressing interference with PT-RSs that are transmitted from a plurality of base stations (BSs; sometimes referred to as "gNBs") or a plurality of mobile stations (terminals; sometimes referred to as "UEs (pieces of user equipment)").

An embodiment of the present disclosure facilitates providing a transmitter, a receiver, a transmission method, and a reception method that can appropriately suppress interference with PT-RSs that are transmitted from a plurality of base stations or mobile stations.

According to an embodiment of the present disclosure, there is provided a transmitter including an assignment circuit that maps a phase tracking reference signal onto a subcarrier and a transmitting circuit that transmits a signal containing the phase tracking reference signal. The phase tracking reference signal is mapped onto a different subcarrier for each cell, group, or mobile station.

According to an embodiment of the present disclosure, there is provided a receiver including a receiving circuit that receives a signal containing a phase tracking reference signal and a demodulating circuit that demodulates a data signal by using a phase noise estimated value calculated using the phase tracking reference signal. The phase tracking reference signal is mapped onto a different subcarrier for each cell, group, or mobile station.

According to an embodiment of the present disclosure, there is provided a transmission method including mapping a phase tracking reference signal onto a subcarrier and transmitting a signal containing the phase tracking reference signal. The phase tracking reference signal is mapped onto a different subcarrier for each cell, group, or mobile station.

According to an embodiment of the present disclosure, there is provided a reception method including receiving a signal containing a phase tracking reference signal and demodulating a data signal by using a phase noise estimated value calculated using the phase tracking reference signal. The phase tracking reference signal is mapped onto a different subcarrier for each cell, group, or mobile station.

It should be noted that general or specific embodiments may be implemented as a system, a method, an integrated circuit, a computer program, a storage medium, or any selective combination of a method, an apparatus, an integrated circuit, a computer program, and a storage medium.

An embodiment of the present disclosure makes it possible to appropriately suppress interference with PT-RSs that are transmitted from a plurality of base stations or mobile stations.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
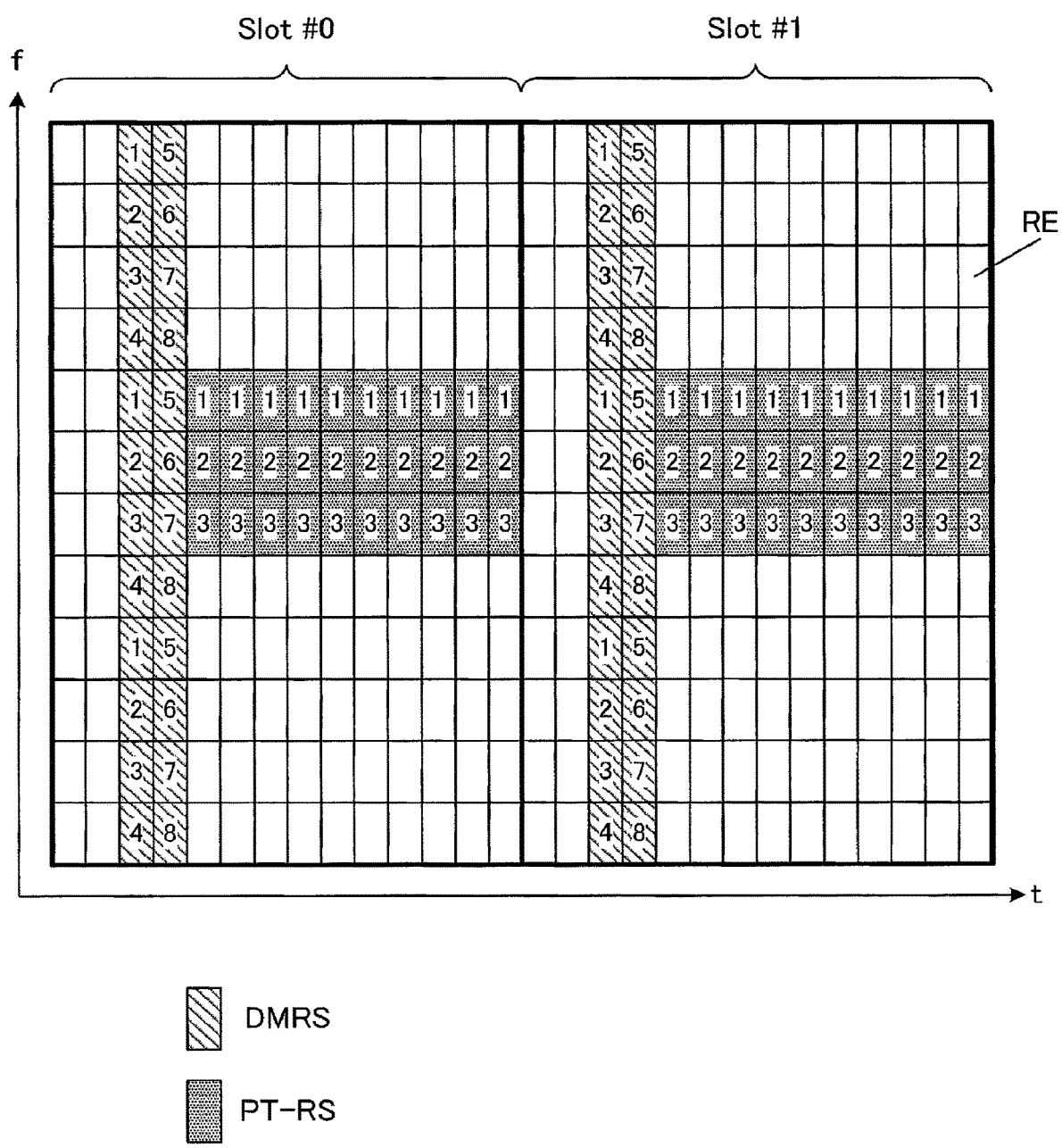
FIG. 1 shows an example of mapping of DMRSs and PT-RSs.

Embodiments of the present disclosure are described in detail below with reference to the drawings.

When a signal is assigned to a higher frequency band or when a higher modulation multivalued number is used for a signal, CPE/ICI exerts a greater influence on error rate characteristics. Accordingly, as mentioned above, in a case where a high frequency band and a higher-order modulation multivalued number are used, a receiver's performing a CPE/ICI correction by means of a PT-RS in addition to performing channel equalization has been under consideration.

For tracking of CPE/ICI, which randomly fluctuates over time, PT-RSs are more densely mapped onto a time axis than channel estimating (demodulating) reference signals (DMRSs: demodulation reference signals). Specifically, it is assumed that the density of allocation of PT-RSs that are mapped in a time domain is set, as in the case of the allocation of PT-RSs onto every symbol, every symbol out of two adjacent symbols, every symbol out of four adjacent symbols, or the like. Further, since CPE/ICI has the characteristics of fluctuating little between subcarriers, PT-RSs are comparatively less densely mapped in a frequency domain. Specifically, it is assumed that the density of allocation of PT-RS that are mapped in the frequency domain is set, as in the case of the allocation of PT-RSs onto one subcarrier per RB (resource block), one subcarrier per two adjacent RBs, one subcarrier per four adjacent RBs, or the like.

According to the agreements about PT-RSs in 3GPP RAN1#88, PT-RSs are used between a base station (BS, eNB, gNB) and a mobile station (terminal, UE) notified from the base station by higher layer signaling (e.g. RRC (radio resource control) signaling). Further, it is assumed that the density of allocation of PT-RSs in the time domain and the frequency domain flexibly varies according to a modulation multivalued number, a bandwidth, or the like that is used between the base station and the mobile station.

Further, a method by which a mobile station determines the density of allocation of PT-RSs has been under consideration. One method is a method by which the density of allocation of PT-RSs is notified by a PT-RS dedicated control signal from a base station (explicit notification). Another method is a method by which a correspondence relationship between the density of allocation of PT-RSs and a different parameter (e.g. a modulation multivalued number or a bandwidth) is determined in advance and the mobile station determines the density of allocation of PT-RSs with reference to the different parameter and its correspondence relationship, which are notified with DCI (downlink control information) during communication (implicit notification). It should be noted that there is a possibility that a method other than these methods might be used.

Meanwhile, DMRSs for use in channel estimation, whose channel characteristics greatly vary in a frequency domain and do not as greatly vary in a time domain as phase noise, are more densely mapped onto the frequency domain and less densely mapped onto the time domain than PT-RSs. Furthermore, in New RAT, for earlier timing of data demodulation, the introduction of front-loaded DMRSs, which are allocated at the front of slots, is assumed.

Further, in New RAT, it is assumed that MIMO (multiple-input and multiple-output) is used. That is, a base station and one or more mobile stations located within a cell constituted by the base station are capable of transmission and reception through a plurality of antenna ports corresponding to different beams (precodings) that use the same time and frequency resources. Since the base station and the mobile station are each limited in maximum transmission power, it is assumed that they are operated so that a total of transmission power of a plurality of antenna ports that are used for data transmission does not exceed the maximum value of transmission power. Accordingly, transmission power per antenna port can be made greater in a case where transmission is done with one antenna port than in a case where transmission is done with a plurality of antenna ports.

The application of the same precoding to PT-RSs as antenna ports through which to transmit DMRSs (also sometimes referred to as "DMRS ports") has been under consideration, and it is also conceivable that PT-RSs may be defined as part of DMRSs. In this case, DMRSs that are used as PT-RSs are more densely mapped in the time domain and less densely mapped in the frequency domain than other DMRSs. Further, reference signals that are used for correction of CPE/ICI that occurs due to phase noise may be called in a name different from "PT-RS".

Further, PT-RSs are transmitted and received between a base station and each mobile station located within a cell constituted by the base station. Note here that since a group of antenna ports that share a local oscillator of a transmitter (in a downlink, a base station; in an uplink, a mobile station) are equal in value of CPE/ICI, PT-RSs need only be transmitted from any antenna port within the group and do not need to be transmitted from all of the antenna ports within the group. Therefore, the number of antenna ports through which to transmit and receive data may be smaller than the number of antenna ports through which to transmit and receive PT-RSs.

Furthermore, it is conceivable that a PT-RS that is transmitted to one mobile station may be orthogonally multiplexed onto data. Further, it is also conceivable that PT-RSs may be subjected to FDM (frequency division multiplexing) onto each other. Therefore, in a case where when a PT-RS of one antenna port is transmitted over one RE (resource element), data or a PT-RS of another antenna port is not transmitted over the same RE.

For this reason, it is conceivable that the transmission power of one antenna port of a PT-RS per RE may be greater than the transmission power of one antenna port of data per RE. As mentioned above, PT-RSs interfere with each other, as they are transmitted from a base station (downlink) that constitutes a plurality of cells or from a plurality of mobile stations (uplink). In so doing, the magnitude of interference that a PT-RS that is transmitted from an antenna port causes with another cell is greater than the magnitude of interference that data that is transmitted from an antenna port causes with another cell.

FIG. 1 shows an example of mapping of DMRSs and PT-RSs in MIMO. The numbers in the REs on which DMRSs and PT-RSs are mapped represent port numbers. That is, DMRSs and PT-RSs of the same number in FIG. 1 share a precoding.

Further, in NR (New Radio), the use of a CF-OFDM (cyclic prefix-orthogonal frequency division multiplexing) scheme is assumed in a downlink (direction from a base station to a mobile station). Meanwhile, in an uplink (direction from a mobile station to a base station), both the CP-OFDM scheme and a DFT-S-OFDM (discrete Fourier transform-spread OFDM) scheme are under consideration, and for example, switching between communication schemes according to communication environment for use is assumed.

For example, in the case of a downlink, when a PT-RS that is transmitted from a base station to which a mobile station is connected is present in the same RE as a PT-RS that is transmitted from another base station, the PT-RSs collide with each other. At this time, in a case where the transmission power of a PT-RS per RE of one antenna port is higher than the transmission power of data, the amount of inference between the PT-RSs is larger than in a case where the data and the PT-RS and the data collide with each other. Similarly, in the case of an uplink, a collision between a PT-RS that is transmitted from a mobile station to which a base station is connected and a PT-RS that is transmitted from another mobile station connected to another base station makes the amount of inference between the PT-RSs larger than in a case where data and a PT-RS collide with each other.

Embodiments of the present disclosure describe methods for suppressing a collision between PT-RSs and preventing an increase in amount of interference.

Embodiment 1

[Brief Overview of Communication System]

A communication system according to the present embodiment includes a transmitter 100 and a receiver 200. That is, in a downlink, the transmitter serves as a base station, and the receiver serves as a mobile station. Further, in an uplink, the transmitter serves as a mobile station, and the receiver serves as a base station.

Figure 2:
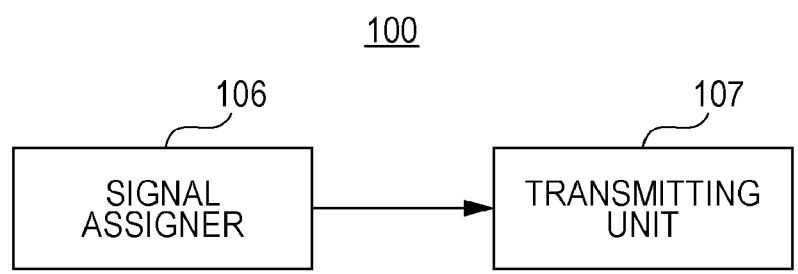
FIG. 2 shows a configuration of a part of a transmitter according to Embodiment 1.

FIG. 2 is a block diagram showing a configuration of a part of the transmitter 100 according to the present embodiment. As shown in FIG. 2, the transmitter 100 includes a signal assigner 106 (assignment circuit) that maps a phase tracking reference signal (PT-RS) onto a subcarrier and a transmitting unit 107 (transmitting circuit) that transmits a signal containing the PT-RS.

Figure 3:
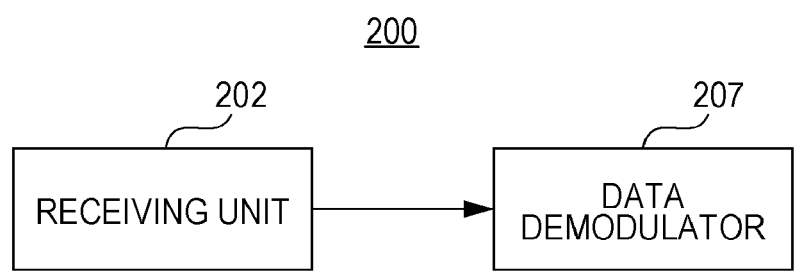
FIG. 3 shows a configuration of a part of a receiver according to Embodiment 1.

FIG. 3 is a block diagram showing a configuration of a part of the receiver 200 according to the present embodiment. As shown in FIG. 3, the receiver 200 includes a receiving unit 202 (receiving circuit) that receives a signal containing a PT-RS and a data demodulator 207 that demodulates a data signal by using a phase noise estimated value (CPE/ICI estimated value) calculated using the phase-tracking reference signal (PT-RS).

Note here that the PT-RS is mapped onto a different subcarrier for each cell, group, or mobile station.

[Configuration of Transmitter]

Figure 4:
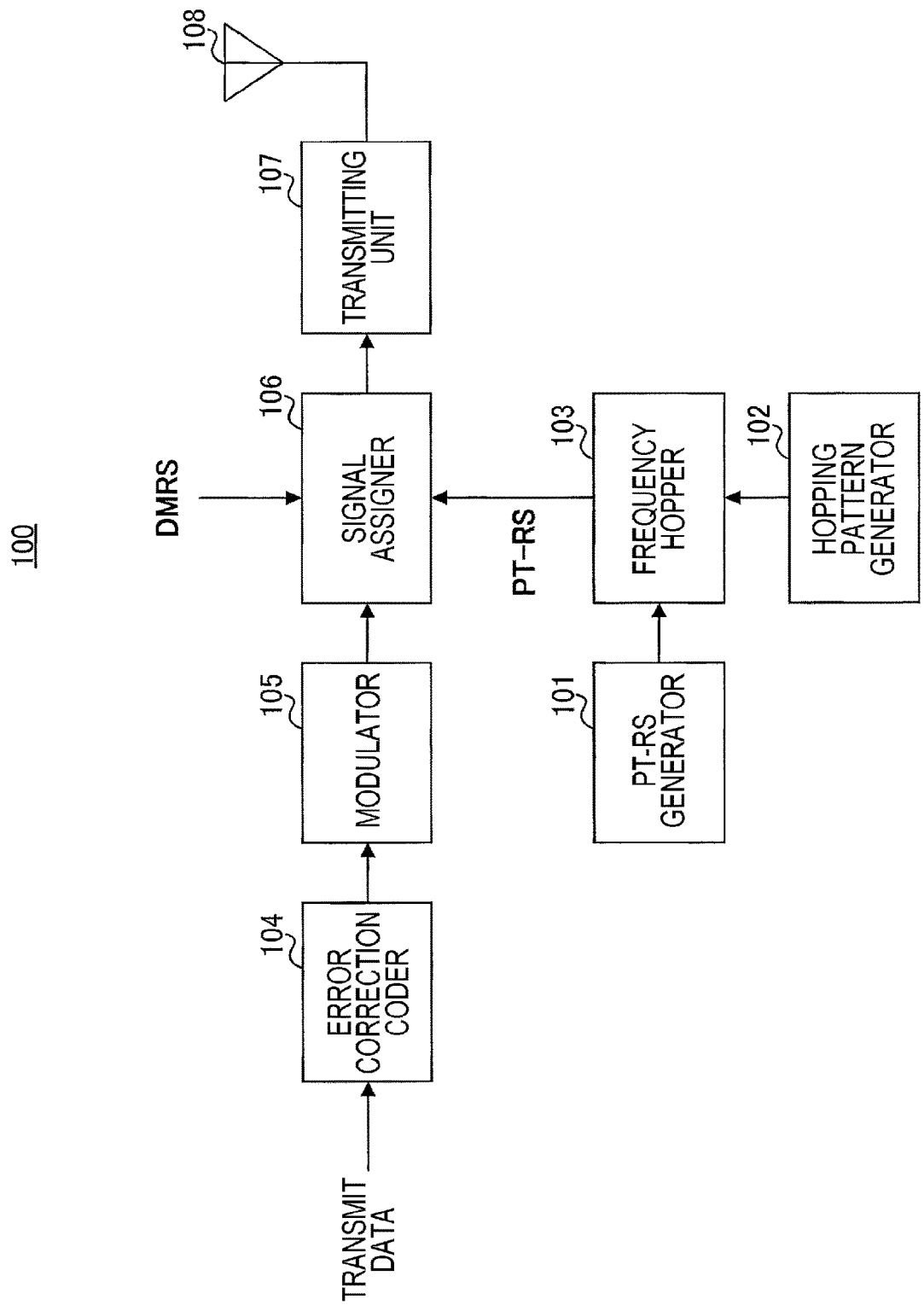
FIG. 4 shows a configuration of the transmitter according to Embodiment 1.

FIG. 4 is a block diagram showing a configuration of the transmitter 100 according to the present embodiment. As shown in FIG. 4, the transmitter 100 includes a PT-RS generator 101, a hopping pattern generator 102, a frequency hopper 103, an error correction coder 104, a modulator 105, the signal assigner 106, the transmitting unit 107, and an antenna 108.

The PT-RS generator 101 generates a PT-RS and outputs the PT-RS thus generated to the frequency hopper 103.

The hopping pattern generator 102 determines a hopping pattern (e.g. the initial position of the PT-RS and a hopping offset) by using at least one of a cell ID, a group ID, a UE ID (mobile station ID), a slot number, and the like. The hopping pattern may be calculated, for example, from a specified hopping pattern generating formula. The hopping pattern generator 102 outputs the hopping pattern thus determined to the frequency hopper 103.

For example, the cell ID is a cell ID that corresponds to a base station to which a mobile station is connected, the group ID is an ID of a group to which a mobile station belongs, and the UE ID is an ID of a mobile station.

The frequency hopper 103 causes the PT-RS inputted from the PT-RS generator 101 to hop from one position to another every unit time (such as symbol, slot, mini slot, sub-frame, or frame) in accordance with the hopping pattern inputted from the hopping pattern generator 102 and outputs, to the signal assigner 106, the PT-RS subjected to hopping. It should be noted that the frequency hopper 103 may output the PT-RS to the signal assigner 106 without performing frequency hopping on the PT-RS.

The error correction coder 104 receives a transmit data signal, subjects the transmit data signal to error correction coding, and outputs the signal subjected to the error correction coding to the modulator 105.

The modulator 105 performs a modulation process on the signal inputted from the error correction coder 104 and outputs the data signal thus modulated to the signal assigner 106.

The signal assigner 106 maps a DMRS, the data signal inputted from the modulator 105, and the PT-RS inputted from the frequency hopper 103 onto time and frequency domains and outputs the signals thus mapped to the transmitting unit 107.

The transmitting unit 107 subjects the signals inputted from the signal assigner 106 to a radio transmission process such as frequency conversion through carrier waves and outputs the signals subjected to the radio transmission process to the antenna 108.

The antenna 108 emits, toward the receiver 200, the signals inputted from the transmitting unit 107.

[Configuration of Receiver]

Figure 5:
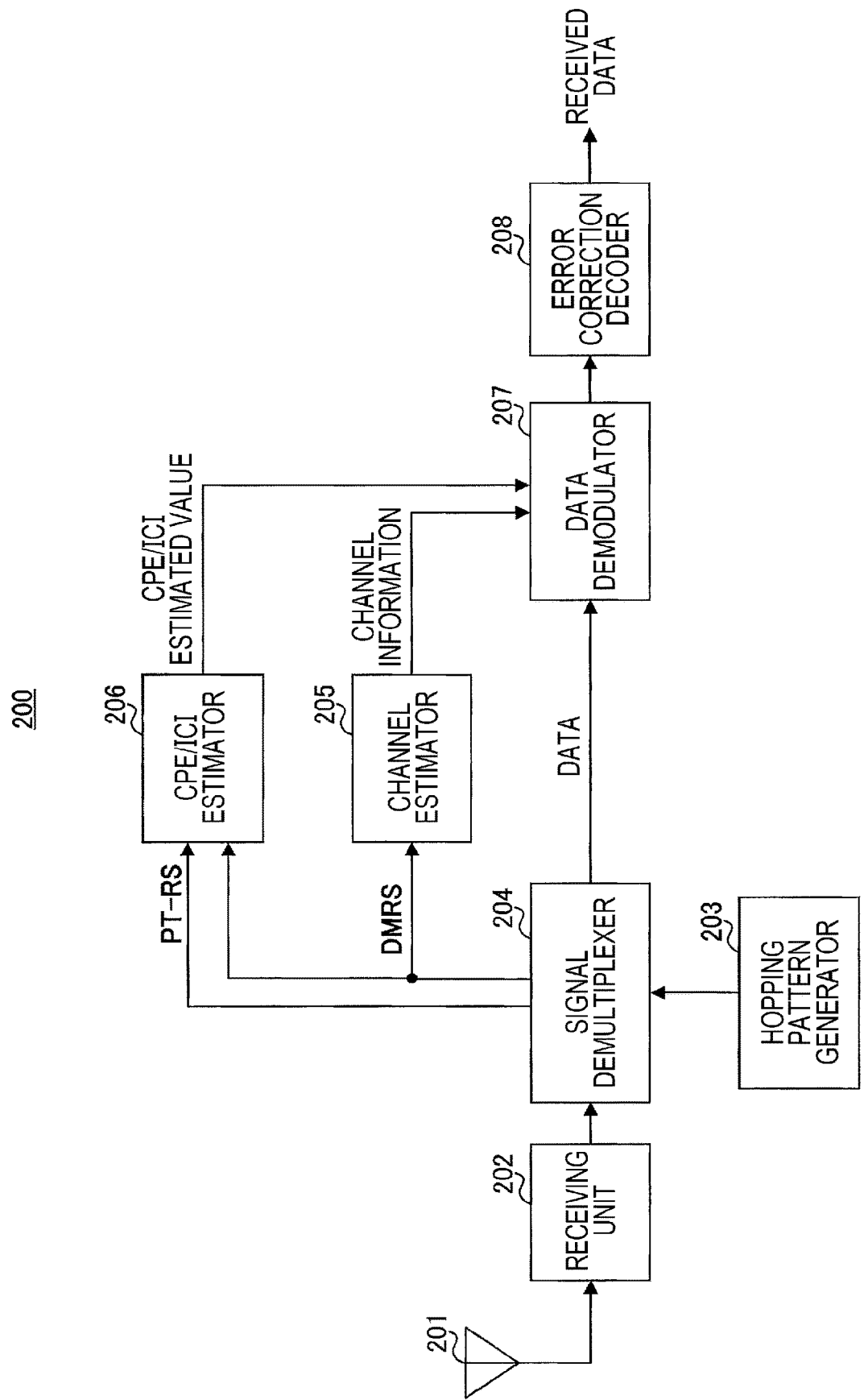
FIG. 5 shows a configuration of the receiver according to Embodiment 1.

FIG. 5 is a block diagram showing a configuration of the receiver 200 according to the present embodiment. As shown in FIG. 5, the receiver 200 includes an antenna 201, a receiving unit 202, a hopping pattern generator 203, a signal demultiplexer 204, a channel estimator 205, a CPE/ICI estimator 206, a data demodulator 207, and an error correction decoder 208.

The antenna 201 receives a signal transmitted from the transmitter 100 (see FIG. 4) and outputs the received signal to the receiving unit 202.

The receiving unit 202 subjects the received signal inputted from the antenna 201 to a radio reception process such as frequency conversion and outputs the signal subjected to the radio reception process to the signal demultiplexer 204.

As is the case with the transmitter 100 (hopping pattern generator 102), the hopping pattern generator 203 determines, by using at least one of a cell ID, a group ID, a UE ID, a slot number, and the like, the hopping pattern (e.g. the initial position of a PT-RS and a hopping offset) used for the transmission of the PT-RS. The hopping pattern may be calculated from the same hopping pattern generating formula as the hopping pattern generating formula that the transmitter 100 uses. The hopping pattern generator 203 outputs the hopping pattern thus determined to the signal demultiplexer 204.

The signal demultiplexer 204 uses the hopping pattern inputted from the hopping pattern generator 203 to identify, from inside the signal inputted from the receiving unit 202, the positions in the time and frequency domains on which the data, the DMRS, and the PT-RS are mapped and demultiplexes the signals from one another. Of the signals thus demultiplexed, the signal demultiplexer 204 outputs the data to the data demodulator 207, outputs the DMRS to the channel estimator 205 and the CPE/ICI estimator 206, and outputs the PT-RS to the CPE/ICI estimator 206.

The channel estimator 205 estimates channel information by using the DMRS inputted from the signal demultiplexer 204 and outputs the channel estimation information (channel information) to the data demodulator 207.

The CPE/ICI estimator estimates CPE/ICI by using the PT-RS and DMRS inputted from the signal demultiplexer 204 and outputs a CPE/ICI estimated value to the data demodulator 207.

The data demodulator 207 demodulates, by using the channel estimation information inputted from the channel estimator 205 and the CPE/ICI estimated value inputted from the CPE/ICI estimator 206, the data signal inputted from the signal demultiplexer 204. The data demodulator 207 outputs the demodulated signal to the error correction decoder 208.

The error correction decoder 208 decodes the demodulated signal inputted from the demodulator 207 and outputs a received data signal thus obtained.

[Operation of Transmitter 100 and Receiver 200]

The following describes in detail how the transmitter 100 and the receiver 200 operate.

Figure 6:
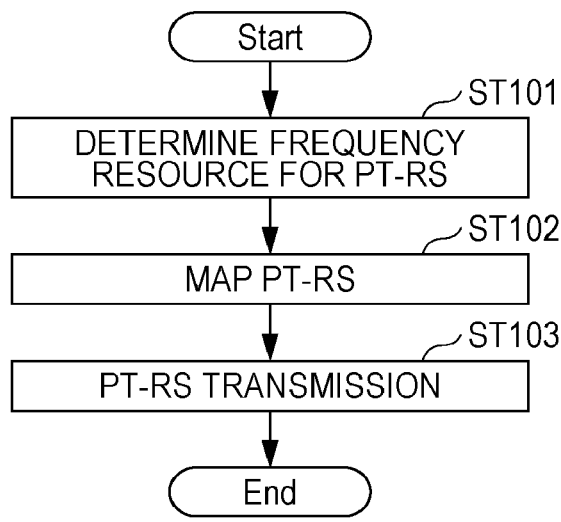
FIG. 6 shows a process of the transmitter according to Embodiment 1.
Figure 7:
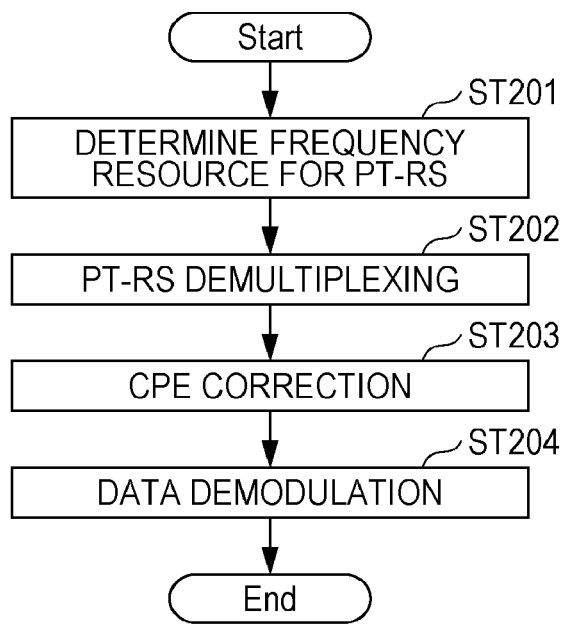
FIG. 7 shows a configuration of the receiver according to Embodiment 1.

FIG. 6 shows an example of the flow of a process of the transmitter 100, and FIG. 7 shows an example of the flow of a process of the receiver 200.

In FIG. 6, the transmitter 100 determines a frequency resource (subcarrier) onto which to map a PT-RS (ST101). Further, the transmitter 100 may also perform frequency hopping on the PT-RS.

Next, the transmitter 100 maps the PT-RS onto the frequency resource determined in ST101 (ST102). Then, the transmitter 100 transmits a signal containing the PT-RS to the receiver 200 (ST103).

Meanwhile, as is the case with the transmitter 100 (ST101), the receiver 200 determines a frequency source (subcarrier, hopping pattern) onto which the PT-RS is mapped (ST201). Next, on the basis of the frequency resource determined in ST201, the receiver 200 demultiplexes the PT-RS (and a DMRS and data) from the signal transmitted from the transmitter 100 (ST202). Next, the receiver 200 performs a CPE/ICI estimation by using the PT-RS (and the DMRS) (ST203). Then, the receiver 200 demodulates the data by using a CPE/ICI estimated value (ST204).

In so doing, the PT-RS transmitted from the transmitter 100 is mapped onto a different subcarrier for each cell, group, or mobile station. This makes it possible to prevent the PT-RS transmitted from the transmitter 100 from being transmitted over the same subcarrier as a PT-RS of another cell, group, or mobile station, thus making it possible to reduce collisions between PT-RSs. That is, this makes it possible to reduce the possibility that the PT-RS transmitted from the transmitter 100 may suffer interference from a PT-RS of another cell, group, or mobile station.

It should be noted that subcarriers onto which PT-RSs are mapped may be associated with each separate cell ID, group ID, or UE ID or may be notified from a base station to a mobile station by higher layer signaling.

The following describes methods (i.e. the processes in ST 101 shown in FIG. 6 and ST201 shown in FIG. 7) by which the transmitter 100 and the receiver 200 determine frequency resources (subcarriers) onto which to map PT-RSs.

It should be noted that the following describes a case where PT-RSs are subjected to frequency hopping every slot.

Operation Example

According to this operation example, in the first slot in a frame onto which PT-RSs are mapped, the PT-RSs are mapped at regular spacings in a uniformly-distributed manner in the frequency domain. Further, in a subsequent slot of the frame, identical hopping offsets are applied to all PT-RSs within an assigned band of a mobile station.

That is, in the operation example according to the present embodiment, the transmitter 100 performs frequency hopping on the PT-RSs so that subcarriers onto which the PT-RSs are mapped in each slot are uniformly distributed at regular spacings. In other words, the transmitter 100 (signal assigner 106) maps, at regular spacings in the frequency domain, a plurality of PT-RSs that are transmitted in each slot (at a given time).

For example, the transmitter 100 (hopping pattern generator 102) and the receiver 200 (hopping pattern generator 203) determine the initial positions of PT-RSs and hopping offsets in the following way.

The following assumes that the size of the assigned band of the mobile station is "$N_{UE\_BW}$ [RB]" and the density of allocation in the frequency domain of PT-RSs that are mapped to the mobile station is "one per $N_{density}$ [RB]".

First, a method is described by which to determine the frequency positions of PT-RSs (i.e. the initial positions of PT-RSs) in the first slot in a frame onto which the PT-RSs are allocated.

The transmitter 100 selects one subcarrier as an initial position from among $N_{UE\_BW}$ RBs (1 RB=12 subcarriers here) assigned to the mobile station and maps a PT-RS onto the subcarrier in the initial position thus selected. In selecting an initial position (subcarrier), the transmitter 100 uses a pseudo-random number function and at least one of "the cell ID, the group ID, and the UE ID". This allows as different subcarriers as possible to be selected among different cells, different groups, or different mobile stations.

Next, in an RB located $N_{density}$ away from the RB on which the aforementioned PT-RS is allocated, the transmitter 100 maps a PT-RS onto the same subcarrier as the subcarrier of the RB on which the aforementioned PT-RS is mapped. The transmitter 100 repeats this process until PT-RSs are mapped onto $N_{UE\_BW}/N_{density}$ subcarriers (i.e. on all RBs onto which PT-RSs are mapped).

Since each of the RBs within the assigned band onto which PT-RSs are mapped is identical in PT-RS initial position (subcarrier) to the other one of the RBs, the PT-RSs in the first slot are uniformly mapped at regular spacings in the frequency domain.

Next, a method is described by which to determine hopping offsets against PT-RSs in the second and subsequent slots.

The transmitter 100 selects one hopping set from among [0, 1, 2, . . . , 12$N_{density}$−1], and the value thus selected is "$f_{HOP}$". It should be noted that in selecting a hopping offset, the transmitter 100 uses a pseudo-random number function, at least one of "the cell ID, the group ID, and the UE ID", and a slot number. This allows as different hopping offsets as possible to be selected among different cells, different groups, different mobile stations, or different slots.

In each slot, the transmitter 100 maps PT-RSs onto subcarriers located $f_{HOP}$ away from all subcarriers on which $N_{UE\_BW}/N$ density PT-RSs are mapped in a slot preceding the slot. The transmitter 100 repeats this process for each slot until the frame ends.

Further, through a process which is similar to that of the aforementioned transmitter 100, the receiver 200 identifies hopping patterns (initial positions and hopping offsets) and identifies subcarrier positions onto which PT-RSs transmitted from the transmitter 100 are mapped.

Figure 8:
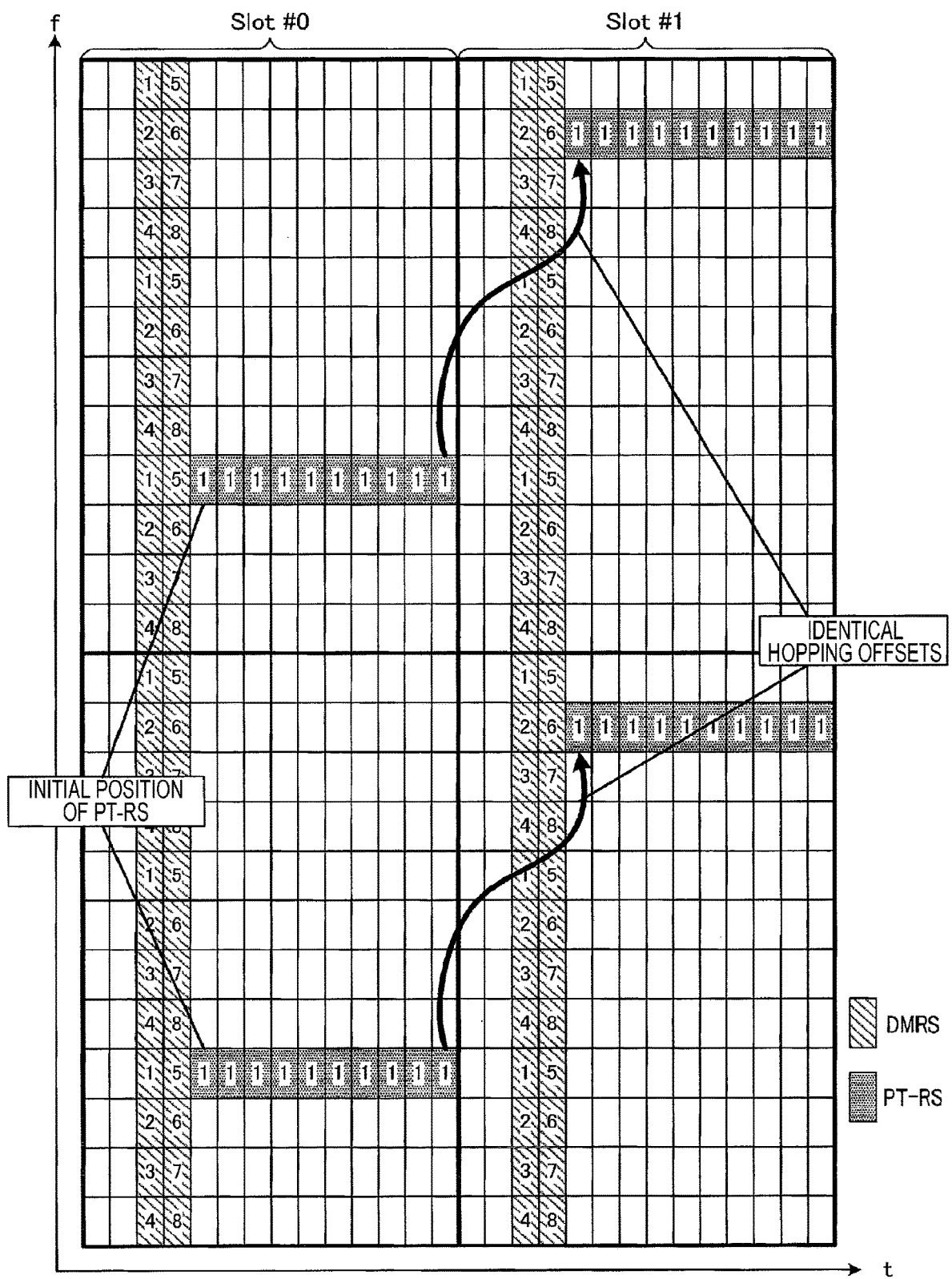
FIG. 8 shows an example of mapping of PT-RSs according to an operation example of Embodiment 1.

FIG. 8 shows an example of mapping of PT-RSs in the operation example according to the present embodiment.

In FIG. 8, the density of allocation of PT-RSs in the frequency domain is "one per RB" (in FIG. 8, one per twelve subcarriers). Therefore, in FIG. 8, in any slot, a PT-RS is mapped on one subcarrier in every RB of the assigned band of the mobile station. Further, frequency hopping of the PT-RSs is performed at the boundary between slots.

As shown in FIG. 8, the initial positions of the PT-RSs in Slot #0 are the same subcarriers (fourth subcarriers of each separate RB) in each separate RB (FIG. 8 shows two RBs). Further, as shown in FIG. 8, the hopping offset $f_{HOP}$ equals 7 subcarriers. Therefore, in Slot #1, the PT-RSs are mapped onto subcarriers (eleventh subcarriers of each separate RB) located $f_{HOP}=7$ subcarriers away from the subcarriers onto which the PT-RSs were mapped in each separate RB of Slot #0.

That is, as shown in FIG. 8, in each slot including the first and subsequent slots, frequency spacings between PT-RSs are uniformly the same (in FIG. 8, one RB (twelve subcarriers).

The foregoing has described the operation example according to the present embodiment.

Thus, in the present embodiment, a PT-RS is mapped onto a different subcarrier for each cell, group, or mobile station. For example, the transmitter 100 determines, according to "the cell ID, the group ID, or the UE ID" or higher layer signaling, a subcarrier onto which to map the PT-RS. This allows the PT-RS to be mapped onto a different subcarrier for each cell, group, or mobile station.

In this way, a plurality of the transmitters 100 that correspond to different cells, different groups, or different mobile stations, respectively, become more likely to transmit PT-RSs by using different frequency resources (subcarriers) in the same time domain (e.g. in the same slot).

This makes it possible, for example, in a downlink, to reduce collisions between PT-RSs that are transmitted from the base station (transmitter 100) to which the mobile station (receiver 200) is connected and PT-RSs that are transmitted from another base station (another transmitter 100). Similarly, this makes it possible, in an unlink, to reduce collisions between PT-RSs that are transmitted from the mobile station (transmitter 100) to which the base station (receiver 200) is connected and PT-RSs that are transmitted from another mobile station (another transmitter 100) connected to another base station.

Therefore, the present embodiment makes it possible to appropriately suppress interference by reducing collisions between PT-RSs that are transmitted from a plurality of base stations or mobile stations.

Further, the transmitter 100 applies frequency hopping to a PT-RS. In so doing, a hopping pattern of the PT-RS is determined on the basis of "the cell ID, the group ID, or the UE ID" and a time-domain index (e.g. a slot number). This makes it more likely that different hopping patterns are used among different cells, groups, or mobile stations and therefore makes it less likely that a PT-RS that the transmitter 100 transmits suffer interference from a PT-RS of another cell, group, or mobile station. That is, interference caused by collisions between PT-RSs among different cells, groups, or mobile stations is randomized. Further, by varying hopping patterns according to the time-domain index in addition to "the cell ID, the group ID, or the UE ID", a plurality of PT-RSs are mapped onto the same subcarrier in a certain slot according to "the cell ID, the group ID, or the UE ID", and even in the event of collisions between PT-RSs, continued collisions between PT-RSs over a plurality of slots can be prevented.

Further, in the first slot in a frame onto which PT-RSs are mapped, the transmitter 100 maps the PT-RSs at regular spacings in a uniformly-distributed manner in the frequency domain, and in a subsequent slot, the transmitter 100 applies identical hopping offsets to all PT-RSs within the assigned band of the mobile station. As a result, subcarriers onto which the PT-RSs are mapped are uniformly distributed at regular spacings in each slot, so that the PT-RSs become robust against the frequency selectivity of channels.

Further, because of the setting in which "the density of allocation of PT-RSs in the frequency domain is one per n (integer) RBs", subcarrier positions onto which PT-RSs are mapped within each separate RB included in the assigned band of the mobile station are identical among the RBs. This eliminates the need for the receiver 200 to identify, for each RB, a subcarrier position onto which a PT-RS is mapped and therefore makes it possible to reduce the amount of calculation of the receiver 200.

(Modification 1 of Embodiment 1)

Although Embodiment 1 has illustrated a case where the number of PT-RS antenna ports is 1 (see, for example, FIG. 8), the number of PT-RS antenna ports may be 2 or larger. In a case where the number of PT-RS antenna ports is more than one, the transmitter 100 may for example select the initial positions of PT-RSs so that the PT-RSs are mapped onto different subcarriers according to antenna port numbers in addition to "the cell ID, the group ID, or the UE ID". Note, however, that hopping offsets against PT-RSs that are transmitted from the plurality of antenna ports, respectively, take on identical values. This is intended to avoid the occurrence of a collision between PT-RS ports due to frequency hopping.

(Modification 2 of Embodiment 1)

Further, in a case where there is coordination among cells and the cells share information as to how PT-RSs are mapped in each cell, these cells may be subjected to uniform mapping of PT-RSs in the frequency domain as in the case of Embodiment 1. For example, in a case where there is coordination among cells, the cells may use an interface between base stations (e.g. an X2 interface) to notify one another of information on subcarriers over which to transmit PT-RSs.

In this way, whereas there is an increased possibility of collisions between PT-RSs among the cells in a case where the cells do not share information on subcarriers over which to transmit PT-RSs, subcarriers onto which to map PT-RSs can be surely varied among the cells in a case where there is coordination among the cells. This makes it possible to avoid collisions between PT-RSs among the cells.

In particular, in Embodiment 1, a spacing between PT-RSs in the frequency domain in one cell is more likely to be identical to or an integer multiple of a spacing between PT-RSs in the frequency domain in another cell, and in a case where the mapping of PT-RSs is individually determined in each cell, there is a higher possibility of simultaneous collisions between PT-RSs over a plurality of subcarriers in each slot. Therefore, the application of the operation of Embodiment 1 to coordinated cells makes it possible to reduce the possibility of simultaneous collisions between PT-RSs over a plurality of subcarriers and, as mentioned above, reduce the amount of calculation in the receiver 200.

Embodiment 2

A transmitter and a receiver according to the present embodiment are described with continued reference to FIGS. 4 and 5, as they are identical in basic configuration to the transmitter 100 and the receiver 200, respectively, according to Embodiment 1.

In the present embodiment, identical or different hopping offsets are applied to PT-RSs that are mapped within the assigned band of the mobile station. That is, whereas subcarriers onto which PT-RSs are mapped in each slot are at regular spacings in Embodiment 1, subcarriers onto which PT-RSs are mapped in each slot are not necessarily at regular spacings (i.e. are at irregular spacings) in the present embodiment.

The following describes Operation Example 1 and Operation Example 2 according to the present embodiment.

Operation Example 1

In Operation Example 1 according to the present embodiment, the whole assigned band of the mobile station serves as candidates for subcarriers onto which PT-RSs hop. That is, in Operation Example 1, the transmitter 100 performs frequency hopping in the whole assigned band of the mobile station and maps a plurality of PT-RSs onto any subcarriers, respectively, within the assigned band.

For example, the transmitter 100 (hopping pattern generator 102) and the receiver 200 (hopping pattern generator 203) determine the initial positions of PT-RSs and hopping offsets in the following way.

The following assumes that the size of the assigned band of the mobile station is "$N_{UE\_BW}$ [RB]" and the density of allocation in the frequency domain of PT-RSs that are mapped to the mobile station is "one per $N_{density}$ [RB]". In this case, $N_{UE\_BW}/N_{density}$ PT-RSs are allocated in each slot. In this example, an index i of [0, 1, 2, . . . , $N_{UE\_BW}/N_{density}$-1] is attached to all of the $N_{UE\_BW}/N_{density}$ PT-RSs.

First, a method is described by which to determine the frequency positions of PT-RSs (i.e. the initial positions of PT-RSs) in the first slot in a frame onto which the PT-RSs are allocated.

The transmitter 100 selects one subcarrier as an initial position from among $N_{UE\_BW}$ RBs (1 RB=12 subcarriers here) assigned to the mobile station and maps a PT-RS onto the subcarrier in the initial position thus selected. In selecting an initial position (subcarrier), the transmitter 100 uses a pseudo-random number function, at least one of "the cell ID, the group ID, and the UE ID", and a PT-RS index i. This allows as different subcarriers as possible to be selected among different cells, different groups, different mobile stations, or different PT-RSs (indices i).

Next, in the same way, the transmitter 100 selects another subcarrier as an initial position from among the $N_{UE\_BW}$ RBs assigned to the mobile station and maps a PT-RS onto the subcarrier in the initial position thus selected. The transmitter 100 repeats the same process until PT-RSs are mapped onto $N_{UE\_BW}/N_{density}$ subcarriers.

Thus, in Operation Example 1 of the present embodiment, the initial positions (subcarriers) of a plurality of PT-RSs within the assigned band of the mobile station are not necessarily at regular spacings but are at irregular spacings. That is, initial positions onto which PT-RSs are mapped may be at irregular spacings.

Next, a method is described by which to determine hopping offsets against PT-RSs in the second and subsequent slots.

The transmitter 100 selects one hopping offset from among [0, 1, 2, . . . , $12N_{UE\_BW}$-1] for each of the $N_{UE\_BW}/N_{density}$ PT-RSs allocated within one slot and subjects the PT-RS to hopping by using the value thus selected. It should be noted that in selecting a hopping offset, the transmitter 100 uses a pseudo-random number function, at least one of "the cell ID, the group ID, and the UE ID", a PT-RS index i, and a slot number. This allows as different hopping offsets as possible to be selected among different cells, different groups, different mobile stations, different PT-RSs, or different slots.

Further, through a process which is similar to that of the aforementioned transmitter 100, the receiver 200 identifies hopping patterns (initial positions and hopping offsets) and identifies subcarrier positions onto which PT-RSs transmitted from the transmitter 100 are mapped.

Figure 9:
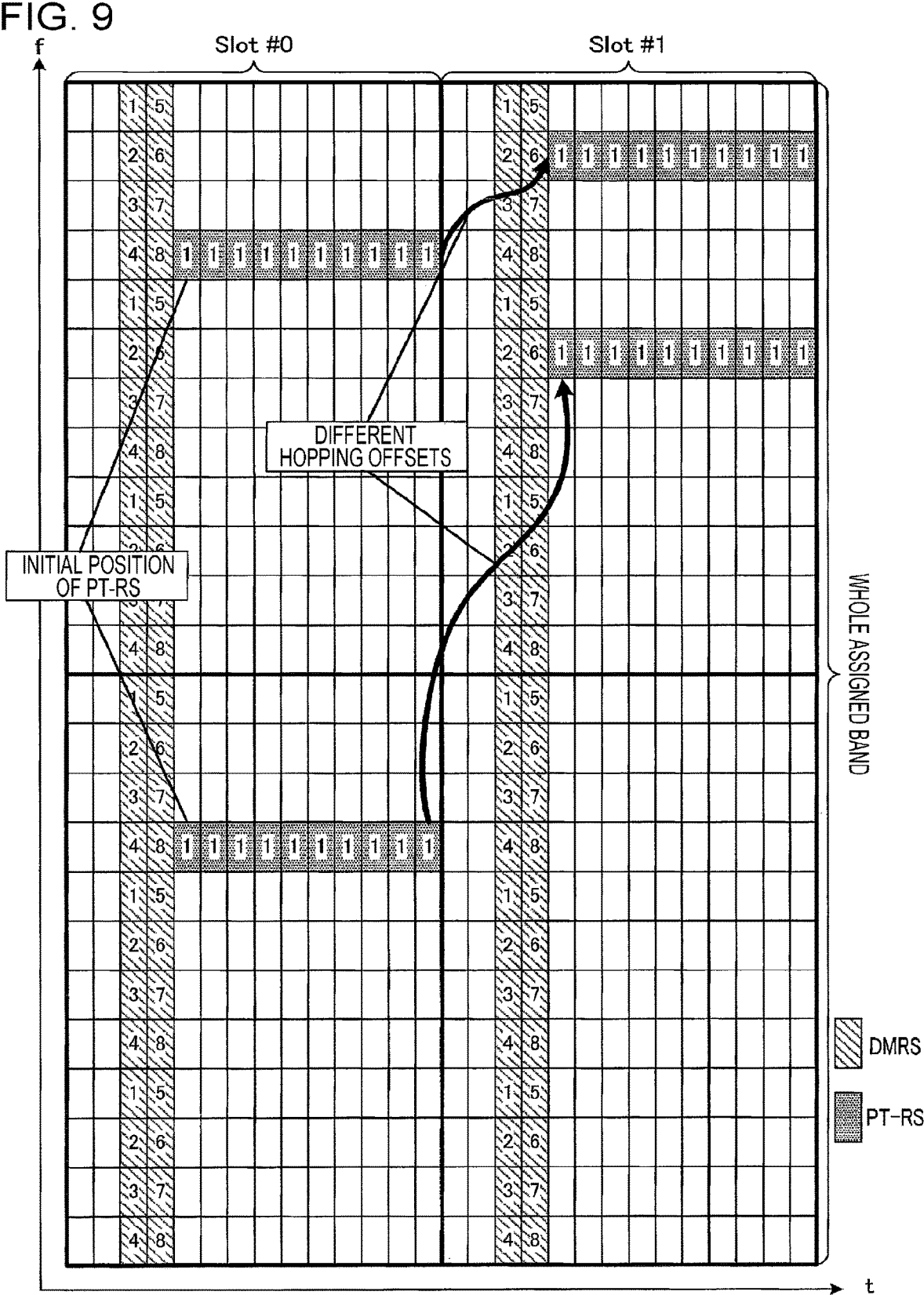
FIG. 9 shows an example of mapping of PT-RSs according to Operation Example 1 of Embodiment 2.

FIG. 9 shows an example of mapping of PT-RSs according to Operation Example 1 of the present embodiment.

In FIG. 9, the density of allocation of PT-RSs in the frequency domain is "one per RB" (i.e. $N_{density}$=1). Further, the assigned band (=$N_{UE\_BW}$) of the mobile station consists of two RBs. Therefore, in each slot, PT-RSs are mapped onto two subcarriers. Further, frequency hopping of the PT-RSs is performed at the boundary between slots.

As shown in FIG. 9, the initial positions of the PT-RSs in Slot #0 are the same subcarriers (ninth subcarriers of each separate RB) in the two RBs within the assigned band. It should be noted that the initial positions of PT-RSs are not necessarily the same subcarrier positions in each separate RB within the assigned band.

Further, as shown in FIG. 9, one of the PT-RSs is subjected to a hopping offset of 2 subcarriers, and the other PT-RS is subjected to a hopping offset of 10 subcarriers. That is, different hopping offsets are set against each separate PT-RS. As a result, as shown in FIG. 9, in Slot #1, the PT-RSs are mapped onto subcarriers located two subcarriers and ten subcarriers, respectively, away from the subcarriers onto which the PT-RSs were mapped in each separate RB of Slot #0. In FIG. 9, in Slot #1, the two PT-RSs are mapped on one of the RBs of the assigned band of the mobile station and no PT-RSs are mapped on the other RB. Thus, the PT-RSs are irregularly mapped in the frequency domain.

In Operation Example 1, hopping offsets are set against a plurality of PT-RSs (in FIG. 9, two PT-RSs) that are mapped in each slot. For this reason, in Operation Example 1, unlike in Embodiment 1 (FIG. 8), hopping offsets are not necessarily identical against all PT-RSs. As a result, as shown in FIG. 9, there is a case where PT-RSs are intensively mapped onto one RB and no PT-RSs are mapped onto another RB. Note, however, that in this case, too, the density of PT-RSs in the assigned band as a whole remains "one per RB".

Thus, in Operation Example 1, in which hopping patterns (initial positions, hopping offsets) are determined against each separate PT-RS, hopping of each PT-RS is high in degree of freedom, so that there is increased randomness of interference.

Although Operation Example 1 (FIG. 9) has illustrated a case where the number of PT-RS antenna ports is 1, the number of PT-RS antenna ports may be 2 or larger. In a case where the number of PT-RS antenna ports is more than one, the transmitter 100 may for example select the initial positions of PT-RSs so that the PT-RSs are mapped onto different subcarriers according to antenna port numbers in addition to "the cell ID, the group ID, or the UE ID" and the PT-RS index i. Note, however, that hopping offsets against PT-RSs that are transmitted from the plurality of antenna ports, respectively, take on identical values. This is intended to avoid the occurrence of a collision between PT-RS ports due to frequency hopping.

Operation Example 2

In Operation Example 2 according to the present embodiment, candidates for subcarriers onto which PT-RSs hop are confined to a limited band. This limited band is hereinafter referred to a "PT-RS sub-band". The bandwidth of a PT-RS sub-band may be set according to the setting of the density of allocation of PT-RSs in the frequency domain so that a PT-RS is mapped onto only one subcarrier in the PT-RS sub-band.

For example, the transmitter 100 (hopping pattern generator 102) and the receiver 200 (hopping pattern generator 203) determine the initial positions of PT-RSs and hopping offsets in the following way.

The following assumes that the size of the assigned band of the mobile station is "$N_{UE\_BW}$ [RB]" and the density of allocation in the frequency domain of PT-RSs that are mapped to the mobile station is "one per $N_{density}$ [RB]". In this case, $N_{UE\_BW}/N_{density}$ PT-RSs are allocated in each slot.

Further, the transmitter 100 divides $N_{UE\_BW}$ RBs into groups of contiguous $N_{density}$ RBs. One group is referred to as "PT-RS sub-band".

First, a method is described by which to determine the frequency positions of PT-RSs (i.e. the initial positions of PT-RSs) in the first slot in a frame onto which the PT-RSs are allocated.

The transmitter 100 selects one subcarrier as an initial position from within a certain PT-RS sub-band of the first slot and maps a PT-RS onto the subcarrier in the initial position thus selected. In selecting an initial position (subcarrier), the transmitter 100 uses a pseudo-random number function, at least one of "the cell ID, the group ID, and the UE ID", and a PT-RS sub-band index. This allows as different subcarriers as possible to be selected among different cells, different groups, different mobile stations, or different PT-RS sub-bands.

The transmitter 100 repeats the initial position setting process on all PT-RS sub-bands.

Next, a method is described by which to determine hopping offsets against PT-RSs in the second and subsequent slots.

For each PT-RS sub-band, the transmitter 100 selects one subcarrier from within the PT-RS sub-band as a hopping-destination subcarrier. For example, in selecting a subcarrier, the transmitter 100 uses a pseudo-random number function, at least one of "the cell ID, the group ID, and the UE ID", a PT-RS sub-band index, and a slot number. This allows as different subcarriers as possible to be selected among different cells, different groups, different mobile stations, different PT-RS sub-bands, or different slots. That is, in each PT-RS sub-band, the difference between the index of a subcarrier selected in the current slot and the index of a subcarrier onto which a PT-RS was mapped in the previous slot serves as a hopping offset.

The transmitter 100 repeats the same subcarrier selecting process on all PT-RS sub-bands.

Further, through a process which is similar to that of the aforementioned transmitter 100, the receiver 200 identifies, for each PT-RS sub-band, a subcarrier position onto which a PT-RS is mapped in each slot.

Figure 10:
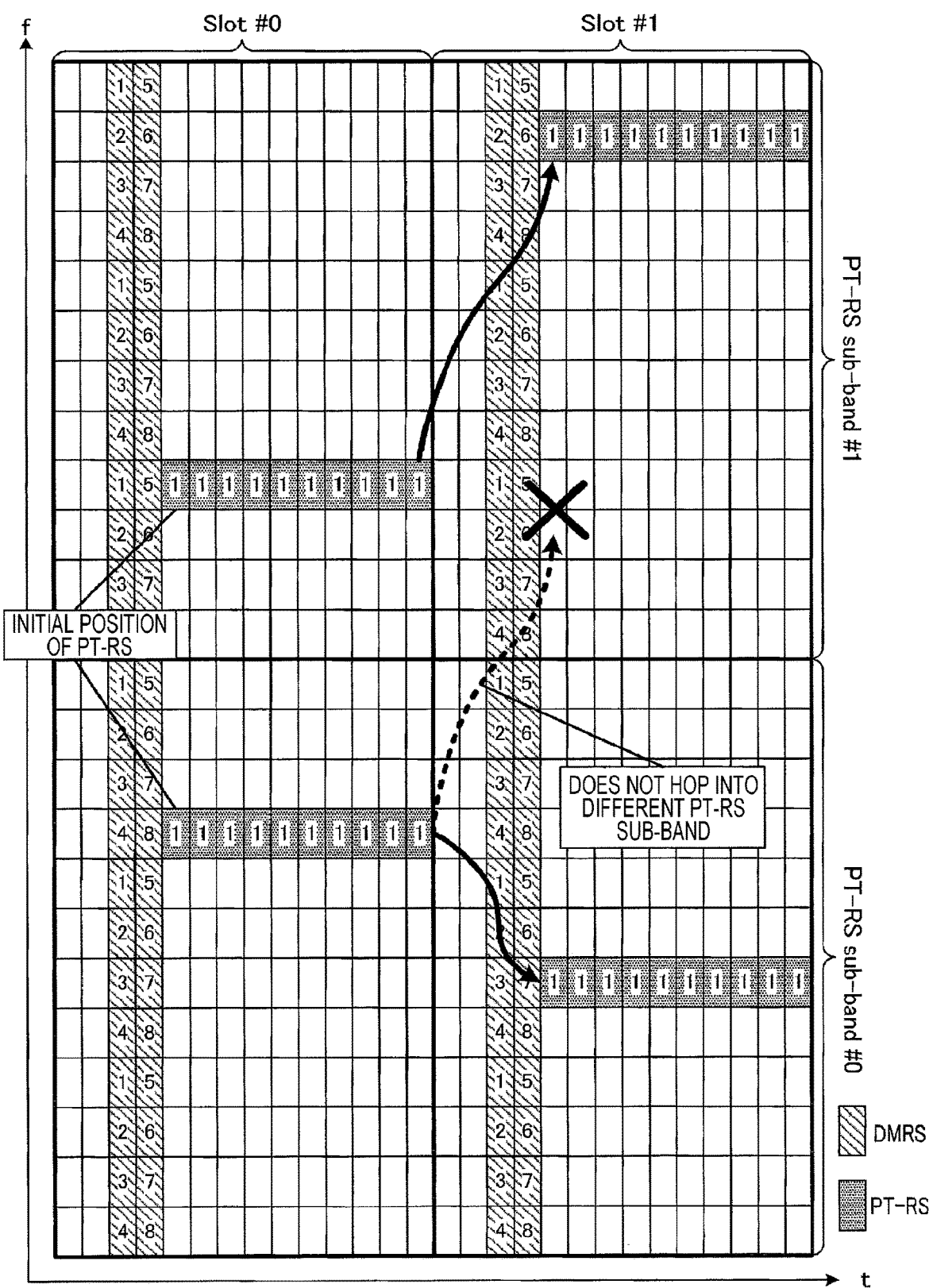
FIG. 10 shows an example of mapping of PT-RSs according to Operation Example 2 of Embodiment 2.

FIG. 10 shows an example of mapping of PT-RSs according to Operation Example 2 of the present embodiment.

In FIG. 10, the density of allocation of PT-RSs in the frequency domain is "one per RB" (i.e. $N_{density}$=1). Further, in FIG. 10, the assigned band of the mobile station is divided into PT-RS sub-bands (including PT-RS sub-bands #0 and #1) for each separate RB. Further, frequency hopping of the PT-RSs is performed at the boundary between slots.

In FIG. 10, the initial positions of the PT-RSs in Slot #0 are selected in each separate PT-RS sub-band. Further, in FIG. 10, as the mapping positions of the PT-RSs in Slot #1, any one subcarrier within each PT-RS sub-band is selected. That is, as shown in FIG. 10, the PT-RS mapped in Slot #0 in PT-RS sub-band #0 does not hop into PT-RS sub-band #1 in Slot #1 but hops onto a subcarrier within PT-RS sub-band #0. The same applies to the PT-RS within PT-RS sub-band #1.

Further, in FIG. 10, unlike in Embodiment 1 (FIG. 8), hopping offsets are not necessarily identical against all PT-RSs, and the frequency spacings between PT-RSs are not uniform.

Thus, in Operation Example 2, the transmitter 100 maps any one of a plurality of PT-RSs onto a corresponding one of a plurality of PT-RS sub-bands (partial bands) and performs frequency hopping on each PT-RS within the corresponding PT-RS sub-band. As a result, since hopping patterns (initial positons, hopping offsets) are determined against each separate PT-RS, hopping of each PT-RS is high in degree of freedom, so that there is increased randomness of interference.

Further, in Operation Example 2, each PT-RS hops within a PT-RS sub-band. That is, in Operation Example 2, frequency hopping of a PT-RS is confined in a PT-RS sub-band, and in any slot, a PT-RS is mapped within each PT-RS sub-band. For this reason, all PT-RSs avoid being mapped onto adjacent subcarriers and become robust against frequency selectivity.

Although Operation Example 2 (FIG. 10) has illustrated a case where the number of PT-RS antenna ports is 1, the number of PT-RS antenna ports may be 2 or larger. In a case where the number of PT-RS antenna ports is more than one, the transmitter 100 may for example select the initial positions of PT-RSs so that the PT-RSs are mapped onto different subcarriers according to antenna port numbers in addition to "the cell ID, the group ID, or the UE ID" and the PT-RS sub-band index. Note, however, that hopping offsets against PT-RSs that are transmitted from the plurality of antenna ports, respectively, take on identical values. This is intended to avoid the occurrence of a collision between PT-RS ports due to frequency hopping.

The foregoing has described Operation Examples 1 and 2 of the present embodiment.

Thus, in the present embodiment, in which PT-RSs are irregularly allocated in the frequency domain, combinations of a plurality subcarriers onto which a plurality of PT-RSs that are transmitted at a given time (e.g. in the same slot) are mapped are more likely to vary among different cells, groups, or mobile stations. Therefore, among different cells, groups, or mobile stations, the possibility of simultaneous collisions between PT-RSs mapped onto a plurality of subcarriers can be reduced.

Further, according to the present embodiment, for example, even if PT-RSs are mapped onto the same subcarriers among different cells, groups, or mobile stations in a certain slot (e.g. the first slot in a frame onto which the PT-RSs are mapped), the PT-RS are more likely to be mapped onto different subcarriers among different cells, groups, or mobile stations in another slot. Therefore, among different cells, groups, or mobile stations, the possibility of simultaneous collisions between PT-RSs over a plurality of slots can be reduced.

(Modification of Embodiment 2)

It should be noted that in a case where there is no coordination among cells and the cells do not share information as to how PT-RSs are mapped in each cell, these cells may be subjected to irregular mapping of PT-RSs in the frequency domain as in the case of Embodiment 2.

In this way, whereas there is an increased possibility of collisions between PT-RSs among the cells in a case where the cells do not share information on subcarriers over which to transmit PT-RSs, irregular mapping of PT-RSs in the frequency domain as in the case of Embodiment 2 increases the randomness of subcarriers onto which the PT-RSs are mapped in each cell, thus making it possible to reduce the possibility of collisions between PT-RSs simultaneously mapped onto a plurality of subcarriers among cells.

(Modifications of Embodiments 1 and 2)

Further, in a case where there is coordination among cells, a plurality of PT-RSs that are transmitted at a given time (e.g. slot) may be uniformly mapped in the frequency domain as in the case of Embodiment 1, and in a case where there is no coordination among cells, a plurality of PT-RSs that are transmitted at a given time may be irregularly mapped (at irregular spacings) in the frequency domain. Further, the transmitter 100 may switch between the PT-RS mapping of Embodiment 1 and the PT-RS mapping of Embodiment 2 according to the presence or absence of coordination among cells.

It should be noted that in a case where there is coordination among cells, the cells may use an interface between base stations (e.g. an X2 interface) to notify one another of information on subcarriers over which to transmit PT-RSs.

By thus flexibly switching between the PT-RS mapping method according to the situation of coordination among cells, PT-RSs can be mapped by an optimum method in each situation. As a result, in a case where there is coordination among cells and the mapping method of Embodiment 1 is applied, the amount of calculation of the receiver 200 can be reduced. Further, in a case where there is no coordination among cells and the mapping method of Embodiment 2 is applied, the possibility of simultaneous collisions of PT-RSs of a plurality of subcarriers can be reduced.

Embodiment 3

A transmitter and a receiver according to the present embodiment are described with continued reference to FIGS. 4 and 5, as they are identical in basic configuration to the transmitter 100 and the receiver 200, respectively, according to Embodiment 1.

In the present embodiment, the transmitter 100 maps a PT-RS onto any of subcarriers on which DMRSs using the same precoding as the PT-RS are mapped. That is, the destination of hopping of a PT-RS is limited to the same subcarrier as a DMRS sharing a precoding. That is, a PT-RS is present on a subcarrier on which a DMRS that is transmitted through the same antenna port is present.

The following describes Operation Examples 1 to 3 according to the present embodiment. It should be noted that the PT-RS mapping methods of Operation Examples 1 to 3 according to the present embodiment correspond to the operation example of Embodiment 1 (see FIG. 8), Operation Example 1 of Embodiment 2 (see FIG. 9), and Operation Example 2 of Embodiment 2 (see FIG. 10), respectively, and differ in that a subcarrier onto which a PT-RS is mapped is limited to a subcarrier on which a DMRS of an identical precoding is mapped.

Operation Example 1

According to Operation Example 1, in the first slot in a frame onto which PT-RSs are mapped, the PT-RSs are mapped at regular spacings in a uniformly-distributed manner in the frequency domain, as is the case with Operation Example 1 of Embodiment 1. Further, in a subsequent slot of the frame, identical hopping offsets are applied to all PT-RSs within the assigned band of the mobile station. That is, the transmitter 100 performs frequency hopping on the PT-RSs so that subcarriers onto which the PT-RSs are mapped in each slot are uniformly distributed at regular spacings.

Note, however, that in Operation Example 1 according to the present embodiment, a subcarrier onto which a PT-RS is mapped (including a hopping-destination subcarrier) is any of subcarriers on which DMRSs subject to the same precoding as the PT-RS are present.

For example, the transmitter 100 (hopping pattern generator 102) and the receiver 200 (hopping pattern generator 203) determine the initial positions of PT-RSs and hopping offsets in the following way.

The following assumes that the size of the assigned band of the mobile station is "$N_{UE\_BW}$ [RB]" and the density of allocation in the frequency domain of PT-RSs that are mapped to the mobile station is "one per $N_{density}$ [RB]".

Further, it is assumed that PT-RSs are transmitted by the same precoding as DMRS Port Numbers 1 to $N_{port}$. That is, PT-RSs are transmitted through $N_{port}$ antenna ports.

First, a method is described by which to determine the frequency positions of PT-RSs (i.e. the initial positions of PT-RSs) in the first slot in a frame onto which the PT-RSs are allocated.

For example, the transmitter 100 maps, onto a subcarrier, a PT-RS subject to the same precoding as DMRS Port Number 1. In so doing, the transmitter 100 selects one subcarrier as an initial position from among subcarriers, included in $N_{UE\_BW}$ RBs (1 RB=12 subcarriers here) assigned to the mobile station, over which DMRSs of DMRS Port Number 1 are transmitted and maps the PT-RS onto the subcarrier in the initial position thus selected. In selecting an initial position (subcarrier), the transmitter 100 uses a pseudo-random number function and at least one of "the cell ID, the group ID, and the UE ID". This allows as different subcarriers as possible to be selected among different cells, different groups, or different mobile stations.

Next, in an RB located $N_{density}$ away from the RB on which the aforementioned PT-RS is allocated, the transmitter 100 maps a PT-RS onto the same subcarrier as the subcarrier of the RB on which the aforementioned PT-RS is mapped (i.e. a subcarrier over which a DMRS of DMRS Port Number 1 is transmitted). The transmitter 100 repeats this process until PT-RSs are mapped onto $N_{UE\_BW}/N_{density}$ subcarriers (i.e. on all RBs onto which PT-RSs are mapped).

Further, upon completion of mapping of PT-RSs corresponding to DMRS Port Number 1, the transmitter 100 maps PT-RSs of other DMRS Port Numbers 2 to $N_{port}$ onto subcarriers in the same way.

Next, a method is described by which to determine hopping offsets against PT-RSs in the second and subsequent slots.

It is assumed here that a DMRS at one DMRS port is mapped every $N_{DMRS\_Space}$ subcarriers.

The transmitter 100 selects one hopping offset from among $[0, N_{DMRS\_Space}, 2N_{DMRS\_space}, \ldots]$ against $N_{UE\_BW}/N_{density}$ PT-RSs of Antenna Port Number 1 and performs frequency hopping of all of the PT-RSs by using the value (hopping offset) thus selected. It should be noted that in selecting a hopping offset, the transmitter 100 uses a pseudo-random number function, at least one of "the cell ID, the group ID, and the UE ID", and a slot number. This allows as different hopping offsets as possible to be selected among different cells, different groups, different mobile stations, or different slots.

Upon completion of frequency hopping of PT-RSs corresponding to Antenna Port Number 1, the transmitter 100 performs frequency hopping on PT-RSs of other Antenna Port Numbers 2 to $N_{port}$ by using the hopping offset used for Antenna Port Number 1.

Further, through a process which is similar to that of the aforementioned transmitter 100, the receiver 200 identifies hopping patterns (initial positions and hopping offsets) and identifies subcarrier positions onto which PT-RSs transmitted from the transmitter 100 are mapped.

Figure 11:
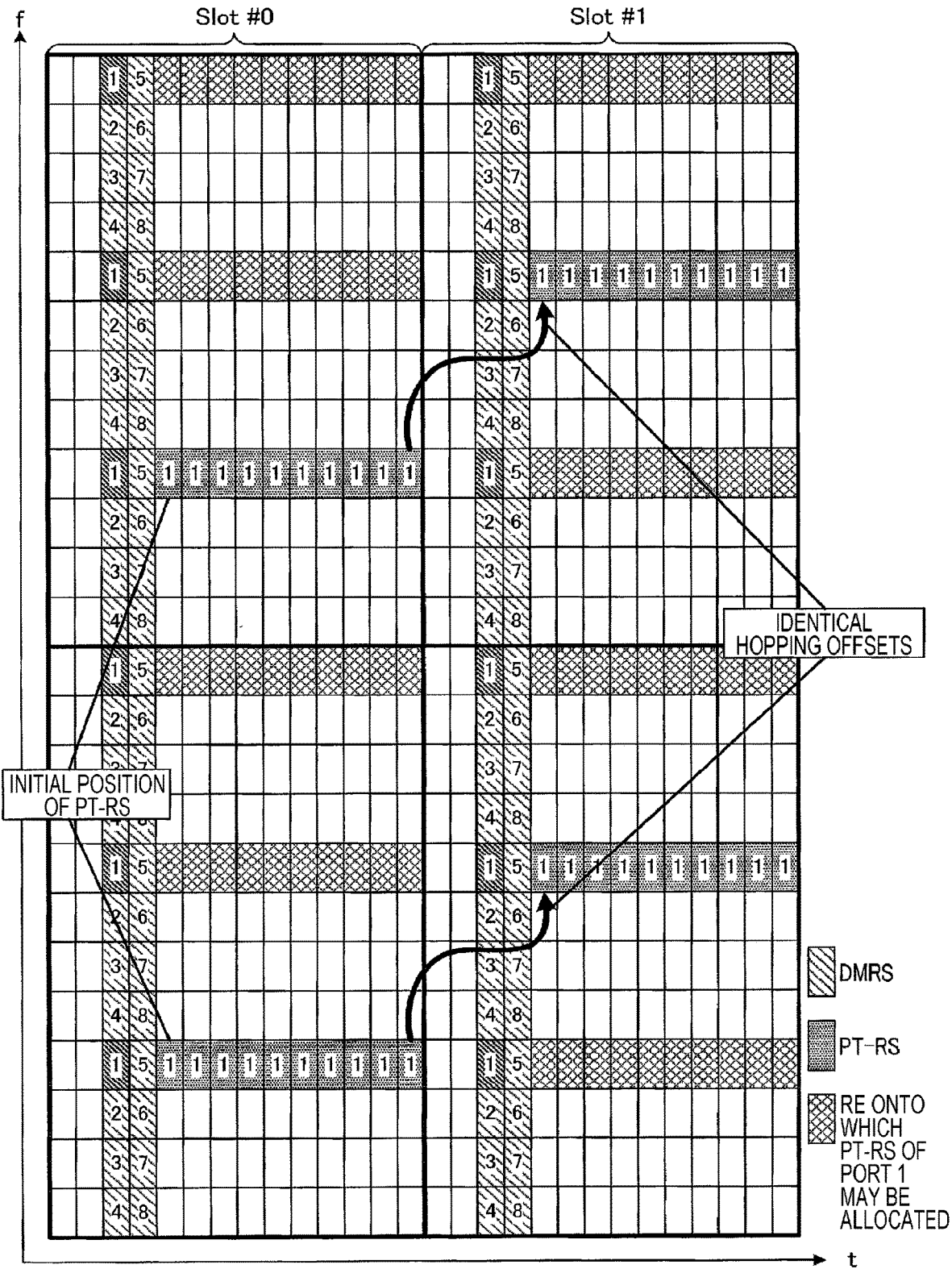
FIG. 11 shows an example of mapping of PT-RSs according to Operation Example 1 of Embodiment 3.

FIG. 11 shows an example of mapping of PT-RSs according to Operation Example 1 of the present embodiment.

In FIG. 11, the density of allocation of PT-RSs in the frequency domain is "one per RB" (i.e. $N_{density}=1$). Therefore, in FIG. 11, in any slot, a PT-RS is mapped on one subcarrier in every RB of the assigned band of the mobile station. Further, $N_{DMRS\_Space}$ equals 4 subcarriers. Further, frequency hopping of the PT-RSs is performed at the boundary between slots.

Further, although FIG. 11 illustrates an example of mapping of PT-RSs of Antenna Port Number 1, PT-RSs of other antenna port numbers may be mapped in the same way.

As shown in FIG. 11, the initial position of each PT-RS of Antenna Port Number 1 in Slot #0 is one (fourth subcarrier of each RB) of subcarriers corresponding to DMRS Port Number 1. Further, as shown in FIG. 11, the hopping offset consists of four subcarriers. Therefore, in Slot #1, a PT-RS is mapped onto a subcarrier (eighth subcarrier of each RB) located four subcarriers away from the subcarrier onto which the PT-RS was mapped in each RB of Slot #0. It should be noted that the hopping offset is not limited to four subcarriers shown in FIG. 11 but needs only be selected from among 0, 4, 8, ..., which are integer multiples of $N_{DMRS\_Space}$.

That is, as shown in FIG. 11, in each slot including the first and subsequent slots, frequency spacings between PT-RSs are uniformly the same (in FIG. 11, one RB (twelve subcarriers). As a result, subcarriers onto which the PT-RSs are mapped are uniformly distributed at regular spacings in each slot, so that the PT-RSs become robust against the frequency selectivity of channels.

Further, in FIG. 11, unlike in Embodiment 1 (FIG. 8), a PT-RS of Antenna Port Number 1 is mapped onto a subcarrier on which a DMRS of the same port (DMRS Port Number 1) is present. That is, a PT-RS of Antenna Port Number 1 (Port 1) may be allocated onto an RE of a subcarrier on which a DMRS of Antenna Port Number 1 is present (see FIG. 11).

Operation Example 2

In Operation Example 2 according to the present embodiment, the whole assigned band of the mobile station serves as candidates for subcarriers onto which PT-RSs hop, as is the case with Operation Example 1 of Embodiment 2. That is, in Operation Example 2, the transmitter 100 performs frequency hopping in the whole assigned band of the mobile station and maps a plurality of PT-RSs onto any subcarriers, respectively, within the assigned band.

Note, however, that in Operation Example 2 according to the present embodiment, a subcarrier onto which a PT-RS is mapped (including a hopping-destination subcarrier) is any of subcarriers on which DMRSs subject to the same precoding as the PT-RS are present.

For example, the transmitter 100 (hopping pattern generator 102) and the receiver 200 (hopping pattern generator 203) determine the initial positions of PT-RSs and hopping offsets in the following way.

The following assumes that the size of the assigned band of the mobile station is "$N_{UE\_BW}$ [RB]" and the density of allocation in the frequency domain of PT-RSs that are mapped to the mobile station is "one per $N_{density}$ [RB]". In this case, $N_{UE\_BW}/N_{density}$ PT-RSs are allocated in each slot. In this example, an index i of $[0, 1, 2, \ldots, N_{UE\_BW}/N_{density}-1]$ is attached to all of the $N_{UE\_BW}/N_{density}$ PT-RSs.

Further, it is assumed that PT-RSs are transmitted by the same precoding as DMRS Port Numbers 1 to $N_{port}$. That is, PT-RSs are transmitted through $N_{port}$ antenna ports.

First, a method is described by which to determine the frequency positions of PT-RSs (i.e. the initial positions of PT-RSs) in the first slot in a frame onto which the PT-RSs are allocated.

For example, the transmitter 100 maps, onto a subcarrier, a PT-RS subject to the same precoding as DMRS Port Number 1. In so doing, the transmitter 100 selects one subcarrier as an initial position from among subcarriers, included in $N_{UE\_BW}$ RBs (1 RB=12 subcarriers here) assigned to the mobile station, over which DMRSs of DMRS Port Number 1 are transmitted and maps the PT-RS onto the subcarrier in the initial position thus selected. In selecting an initial position (subcarrier), the transmitter 100 uses a pseudo-random number function, at least one of "the cell ID, the group ID, and the UE ID", and a PT-RS index i. This allows as different subcarriers as possible to be selected among different cells, different groups, different mobile stations, or different PT-RSs.

Next, in the same way, the transmitter 100 selects another subcarrier as the initial position of a PT-RS of Antenna Port Number 1 from among the $N_{UE\_BW}$ RBs assigned to the mobile station and maps the PT-RS onto the subcarrier in the initial position thus selected. The transmitter 100 repeats the same process until PT-RSs are mapped onto $N_{UE\_BW}/N_{density}$ subcarriers.

Further, upon completion of mapping of PT-RSs corresponding to DMRS Port Number 1, the transmitter 100 maps PT-RSs of other DMRS Port Numbers 2 to $N_{port}$ onto subcarriers in the same way.

Thus, in Operation Example 2, the initial positions (subcarriers) of a plurality of PT-RSs within the assigned band of the mobile station are not necessarily at regular spacings but are at irregular spacings. That is, initial positions onto which PT-RSs are mapped may be at irregular spacings.

Next, a method is described by which to determine hopping offsets against PT-RSs in the second and subsequent slots.

It is assumed here that a DMRS at one DMRS port is mapped every $N_{DMRS\_Space}$ subcarriers.

The transmitter 100 selects one hopping offset from among $[0, N_{DMRS\_Space}, 2N_{DMRS\_Space}, \ldots]$ for each of the $N_{UE\_BW}/N_{density}$ PT-RSs of Antenna Port Number 1 that are mapped within one slot and subjects the PT-RS to hopping by using the value thus selected. It should be noted that a hopping offset that is selected for each PT-RS may be a different value. It should be noted that in selecting a hopping offset, the transmitter 100 uses a pseudo-random number function, at least one of "the cell ID, the group ID, and the UE ID", a PT-RS index i, and a slot number. This allows as different hopping offsets as possible to be selected among different cells, different groups, different mobile stations, different PT-RSs, or different slots.

Upon completion of frequency hopping of PT-RSs corresponding to Antenna Port Number 1, the transmitter 100 performs frequency hopping on PT-RSs of other Antenna Port Numbers 2 to $N_{port}$ by using the hopping offset used for Antenna Port Number 1.

Further, through a process which is similar to that of the aforementioned transmitter 100, the receiver 200 identifies hopping patterns (initial positions and hopping offsets) and identifies subcarrier positions onto which PT-RSs transmitted from the transmitter 100 are mapped.

Figure 12:
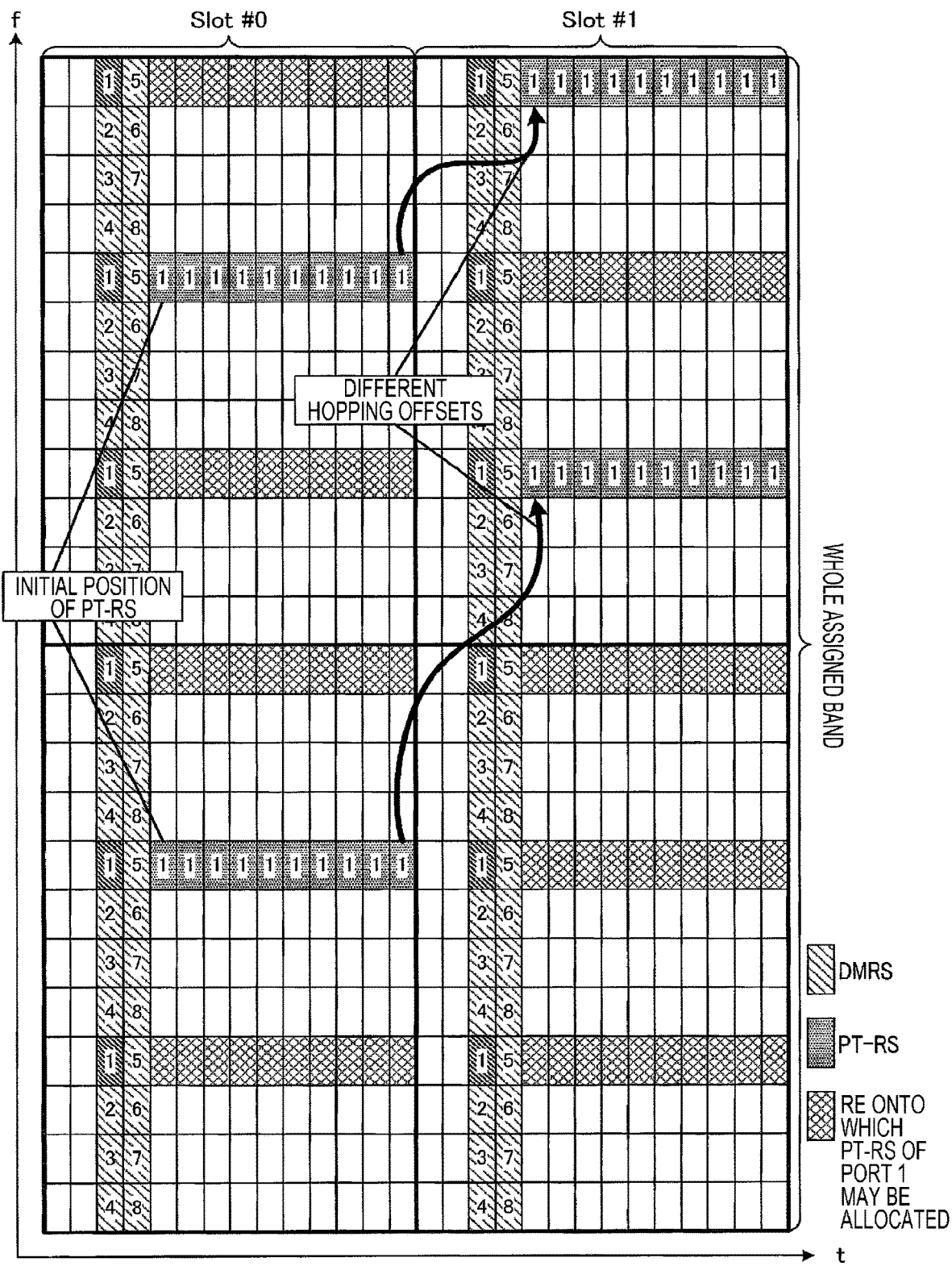
FIG. 12 shows an example of mapping of PT-RSs according to Operation Example 2 of Embodiment 3.

FIG. 12 shows an example of mapping of PT-RSs according to Operation Example 2 of the present embodiment.

In FIG. 12, the density of allocation of PT-RSs in the frequency domain is "one per RB" (i.e. $N_{density}=1$). Further, the assigned band ($=N_{UE\_BW}$) of the mobile station consists of two RBs. Therefore, in each slot, PT-RSs are mapped onto two subcarriers. Further, frequency hopping of the PT-RSs is performed at the boundary between slots.

Further, although FIG. 12 illustrates an example of mapping of PT-RSs of Antenna Port Number 1, PT-RSs of other antenna port numbers may be mapped in the same way.

In FIG. 12, the initial position of each PT-RS of Antenna Port Number 1 in Slot #0 is one of subcarriers corresponding to DMRS Port Number 1. That is, a PT-RS of Antenna Port Number 1 (Port 1) shown in FIG. 12 may be allocated onto an RE of a subcarrier on which a DMRS of Antenna Port Number 1 is present. As shown in FIG. 12, in Slot #0, PT-RSs are mapped onto the same subcarriers (eighth subcarriers of each separate RB) in the two RBs within the assigned band, respectively. Note, however, that the initial positions of the PT-RSs are not necessarily the same subcarrier positions in each separate RB within the assigned band but may be different.

Further, as shown in FIG. 12, one of the PT-RSs is subjected to a hopping offset of 4 subcarriers, which is an integer multiple (single time) of the subcarrier spacing $N_{DMRS\_Space}$ of DMRS Port Number 1, and the other PT-RS is subjected to a hopping offset of 8 subcarriers, which is an integer multiple (two times) of the subcarrier spacing $N_{DMRS\_Space}$. That is, different hopping offsets are set against each separate PT-RS. In FIG. 12, in Slot #1, the two PT-RSs are mapped on one of the RBs of the assigned band of the mobile station and no PT-RSs are mapped on the other RB. Thus, the PT-RSs are irregularly mapped in the frequency domain.

Thus, in Operation Example 2, in which hopping patterns (initial positions, hopping offsets) are determined against each separate PT-RS, hopping of each PT-RS is high in degree of freedom, so that there is increased randomness of interference.

Operation Example 3

In Operation Example 3 according to the present embodiment, candidates for subcarriers onto which PT-RSs hop are confined to a limited band (PT-RS sub-band), as is the case with Operation Example 2 of Embodiment 2. The bandwidth of a PT-RS sub-band may be set according to the setting of the density of allocation of PT-RSs in the frequency domain so that a PT-RS is mapped onto only one subcarrier in the PT-RS sub-band.

Note, however, that in Operation Example 3 according to the present embodiment, a subcarrier onto which a PT-RS is mapped (including a hopping-destination subcarrier) is any of subcarriers on which DMRSs subject to the same precoding as the PT-RS are present.

For example, the transmitter 100 (hopping pattern generator 102) and the receiver 200 (hopping pattern generator 203) determine the initial positions of PT-RSs and hopping offsets in the following way.

The following assumes that the size of the assigned band of the mobile station is "$N_{UE\_BW}$ [RB]" and the density of allocation in the frequency domain of PT-RSs that are mapped to the mobile station is "one per $N_{density}$ [RB]". In this case, $N_{UE\_BW}/N_{density}$ PT-RSs are allocated in each slot.

Further, it is assumed that PT-RSs are transmitted by the same precoding as DMRS Port Numbers 1 to $N_{port}$. That is, PT-RSs are transmitted through $N_{port}$ antenna ports. It is also assumed that a DMRS at one DMRS port is mapped every $N_{DMRS\_Space}$ subcarriers.

Further, the transmitter 100 divides $N_{UE\_BW}$ RBs into groups (PT-RS sub-bands) of contiguous $N_{density}$ RBs.

First, a method is described by which to determine the frequency positions of PT-RSs (i.e. the initial positions of PT-RSs) in the first slot in a frame onto which the PT-RSs are allocated.

The transmitter 100 selects one subcarrier as an initial position from among subcarriers in a certain PT-RS sub-band of the first slot over which DMRSs of DMRS Port Number 1 are transmitted and maps a PT-RS onto the subcarrier in the initial position thus selected. In selecting an initial position (subcarrier), the transmitter 100 uses a pseudo-random number function, at least one of "the cell ID, the group ID, and the UE ID", a PT-RS sub-band index, and antenna port number. This allows as different subcarriers as possible to be selected among different cells, different groups, different mobile stations, different PT-RS sub-bands, or different antenna ports.

The transmitter 100 repeats the initial position setting process on all PT-RS sub-bands.

Further, upon completion of mapping of PT-RSs corresponding to DMRS Port Number 1, the transmitter 100 maps PT-RSs of other DMRS Port Numbers 2 to $N_{port}$ onto subcarriers in the same way.

The following illustrates a specific example of calculation of the initial position of a PT-RS. It is assumed here that $t_0$ is the number of the first slot in which a PT-RS is mapped. A PT-RS of an antenna port p is mapped into the sth PT-RS sub-band in a slot to. Within this PT-RS sub-band, the number of subcarriers onto which the PT-RS can be mapped is $12 \, N_{density}/N_{DMRS\_Space}$. Of the indices of these subcarriers, the smallest number is $k_0^{p,s}$. The index $F_{init}(s, p, t_0)$ of a subcarrier onto which to map the PT-RS may be obtained according to Formula (1):

[Math. 1]

$$F_{init}(s, p, t_0) = k_0^{p,s} + \left\{ \left( \sum_{k=10s+1}^{10s+9} c(k) \times 2^{k-(10s+1)} \right) \bmod \left( 12 \times \frac{N_{density}}{N_{DMRS\_Space}} \right) \right\} \times N_{DMRS\_Space} \quad (1)$$

It should be noted that the pseudo-random number function c(k) used may be a function described in 3GPP Standard 36.211 "7.2 Pseudo-random sequence generation". This function may be initialized by $c_{init}=100N_{ID}+p$. Note here that $N_{ID}$ may be the cell ID, the group ID, the UE ID, or a value obtained by a combination thereof.

Next, a method is described by which to determine hopping offsets against PT-RSs in the second and subsequent slots.

For each PT-RS sub-band, the transmitter 100 selects, as a hopping-destination subcarrier, a subcarrier in the PT-RS sub-band over which a DMRS of DMRS Port Number 1 is transmitted. For example, in selecting a subcarrier, the transmitter 100 uses a pseudo-random number function, at least one of "the cell ID, the group ID, and the UE ID", a PT-RS sub-band index, a slot number, and an antenna port number. This allows as different subcarriers as possible to be selected among different cells, different groups, different mobile stations, different PT-RS sub-bands, different slots, or different antenna ports. That is, in each PT-RS sub-band, the difference between the index of a subcarrier selected in the current slot and the index of a subcarrier onto which a PT-RS was mapped in the previous slot serves as a hopping offset.

The transmitter 100 repeats the same subcarrier selecting process on all PT-RS sub-bands.

The following illustrates a specific example of calculation of a hopping offset of a PT-RS. The index F(s, p, t) of a subcarrier onto which a PT-RS is mapped in a slot t following the first slot $t_0$ may be obtained according to Formula (2):

[Math. 2]

$$F(s, p, t) = k_0^{p,s} + \left\{\left(\sum_{k=10t+1}^{10t+9} c(k) \times 2^{k-(10t+1)}\right) \bmod \left(12 \times \frac{N_{density}}{N_{DMRS\_Space}}\right)\right\} \times N_{DMRS\_Space} \quad (2)$$

Further, the pseudo-random number function c(k) may be initialized by $c_{init}=10000N_{ID}+100s-+p$. Note here that $N_{ID}$ may be the cell ID, the group ID, the UE ID, or a value obtained by a combination thereof. Therefore, the hopping offset $F_{hop}(s, p, t)$ from the slot t−1 to the slot t is determined by Formula (3):

[Math. 3]

$$F_{hop}(s,p,t)=F(s,p,t)-F(s,p,t-1) \quad (3)$$

Further, through a process which is similar to that of the aforementioned transmitter 100, the receiver 200 identifies, for each PT-RS sub-band, a subcarrier position onto which a PT-RS is mapped in each slot.

Figure 13:
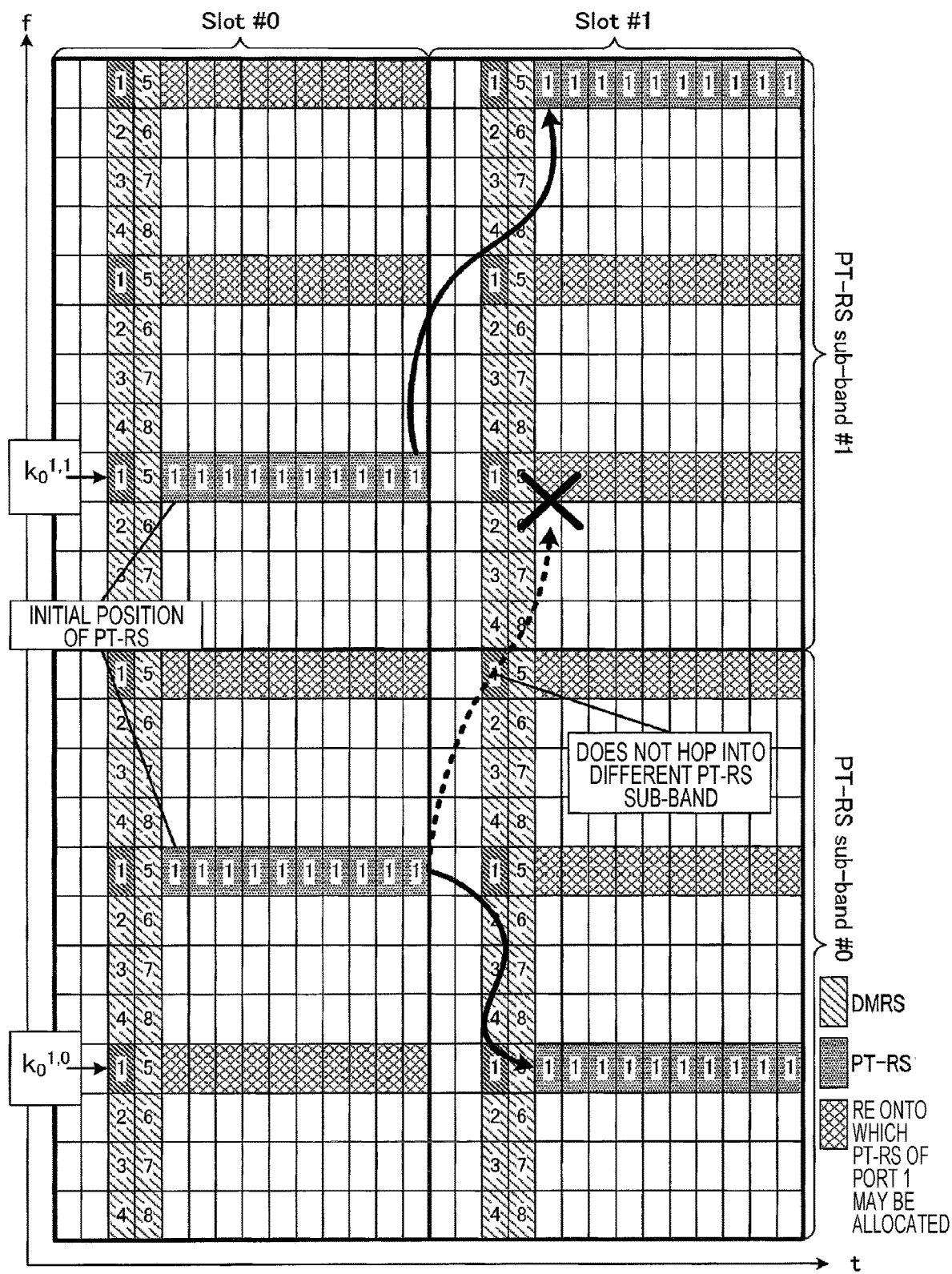
FIG. 13 shows an example of mapping of PT-RSs according to Operation Example 3 of Embodiment 3.

FIG. 13 shows an example of mapping of PT-RSs according to Operation Example 3 of the present embodiment.

In FIG. 13, the density of allocation of PT-RSs in the frequency domain is "one per RB" (i.e. $N_{density}=1$). Further, in FIG. 13, the assigned band of the mobile station is divided into PT-RS sub-bands (including PT-RS sub-bands #0 and #1) for each separate RB. Further, the spacing ($=N_{DMRS\_Space}$) between DMRSs of the same antenna port number is 4 subcarriers. Further, frequency hopping of the PT-RSs is performed at the boundary between slots.

Further, although FIG. 13 illustrates an example of mapping of PT-RSs of Antenna Port Number 1, PT-RSs of other antenna port numbers may be mapped in the same way. That is, a PT-RS of Antenna Port Number 1 (Port 1) shown in FIG. 13 may be allocated onto an RE of a subcarrier on which a DMRS of Antenna Port Number 1 is present.

In FIG. 13, the initial position of each of the PT-RSs in Slot #0 is calculated according to both the smallest number $k_0^{p,s}(k_0^{1,0}, k_0^{1,1})$ of the indices of subcarriers onto which PT-RSs of the antenna port number p=1 can be mapped in a corresponding one of PT-RS sub-bands #0 and #1 and Formula (1). Further, in FIG. 13, as the mapping positions of the PT-RSs in Slot #1, any one subcarrier within each PT-RS sub-band is selected. For example, the mapping position F(s, 1, 1) of each of the PT-RSs of Antenna Port Number 1 (p=1) in Slot #1 (t=1) within the corresponding one of PT-RS sub-bands #0 and #1 (i.e. s=0, 1) may be calculated according to Formula (2).

That is, as shown in FIG. 13, the PT-RS mapped in Slot #0 in PT-RS sub-band #0 does not hop into PT-RS sub-band #1 in Slot #1 but hops onto a subcarrier within PT-RS sub-band #0. The same applies to the PT-RS within PT-RS sub-band #1.

Further, in FIG. 13, unlike in Embodiment 1 (FIG. 8), hopping offsets are not necessarily identical against all PT-RSs, and the frequency spacings between PT-RSs are not uniform.

Thus, in Operation Example 3, the transmitter 100 maps any one of a plurality of PT-RSs onto a corresponding one of a plurality of PT-RS sub-bands (partial bands) and performs frequency hopping on each PT-RS within the corresponding PT-RS sub-band. As a result, since hopping patterns (initial positons, hopping offsets) are determined against each separate PT-RS, hopping of each PT-RS is high in degree of freedom, so that there is increased randomness of interference. Further, in Operation Example 3, each PT-RS hops within a PT-RS sub-band. For this reason, all PT-RSs avoid being mapped onto adjacent subcarriers and become robust against frequency selectivity.

The foregoing has described Operation Examples 1 to 3 of the present embodiment.

Thus, in the present embodiment, a subcarrier onto which a PT-RS is mapped is limited to a subcarrier on which a DMRS using the same precoding as the PT-RS is present. This makes it possible to increase the precision of a CPE/ICI correction in a case where it is assumed that the same spatial channel is used for the DMRS and the PT-RS. Further, since subcarriers onto which PT-RSs can be mapped vary according to antenna port, mapping of PT-RSs of different antenna ports onto the same subcarrier can be avoided.

In Embodiment 3, in a case where subcarriers on which PT-RSs can be present vary from antenna port to antenna port, PT-RSs that are transmitted through different antenna ports are not mapped onto the same subcarrier, so that there is no need to have identical hopping offsets among different antenna ports. Note, however, that even in a case where subcarriers onto which PT-RSs can be mapped overlap as in the case of Antenna Ports 1 and 5 shown in FIG. 13, PT-RS Ports 1 and 5 do not need to be multiplexed onto the same subcarrier but may be mapped onto different subcarriers.

The foregoing has described each embodiment of the present disclosure.

It should be noted that in the embodiments described above, at least one of "a cell ID, a group ID, and a UE ID" and a slot number may be combined for the determination of the initial positions of PT-RSs in the first slot and hopping offsets.

Further, the time-domain index, which is used for the determination of hopping offsets of PT-RSs, does not need to be a symbol number but may be a slot number, a minislot number, a subframe number, a frame number, or a value obtained by a combination thereof.

Further, the temporal period (interval) of frequency hopping may be set to "every symbol", "every two symbols", "every specified number of symbols", "every slot", "every minislot", "every subframe", or the like. For example, a short interval of frequency hopping leads to an increase in randomizedness of interference caused by a collision between PT-RSs, and a long interval of frequency hopping makes it possible to reduce the frequency at which the receiver 200 identifies (calculates) the positions of PT-RSs. Further, the timing of frequency hopping is not limited to the boundary between slots.

Further, the time period of hopping of PT-RSs may be set in combination with the unit of assignment of data. When the unit of assignment of data is a slot, hopping of PT-RSs may be set in a slot unit, too, and when the unit of assignment of data is a minislot, hopping of PT-RSs is set in a minislot unit, too.

Further, even when the unit of assignment of data is a minislot, hopping of PT-RSs may be set in a slot unit. This is because it is conceivable that the unit of assignment of data may be different for each cell. In order to make cells uniform in period of hopping of PT-RSs, the unit of hopping of PT-RSs is set regardless of the unit of assignment of data.

Further, although the embodiments (FIGS. 8 to 13) described above assume that the length of a slot is 14 symbols, the length of a slot is not limited to 14 symbols. For example, the same frequency hopping may be applied even when the length of a slot is 7 symbols. Further, although each of the drawings shows the positions of the REs of DMRSs that are mapped at their respective antenna ports, this is merely an example and is not intended to impose any limitation. Further, DMRSs of different antenna ports may be subjected to CDM (code division multiplexing).

Further, in the case of frequency multiplexing of control channels (PDCCH (Physical Downlink Control Channel) and PUCCH (Physical Uplink Control Channel)) and data channels (PDSCH (Physical Downlink Shared Channel) and PUSCH (Physical Uplink Shared Channel)), PT-RSs may be mapped onto their symbols.

Further, the term "CPE/ICI correction" used in the embodiments described above means "correcting a CPE", "correcting ICI", or "correcting both a CPE and ICI".

Further, in the embodiments described above, the phase noise may be generated from a local generator of the receiver as well as the local oscillator of the transmitter.

Further, the initial positions of PT-RSs, the hopping offsets, the assigned band $N_{UE\_BW}$ [RB], the density of allocation in the frequency domain "one per $N_{density}$ [RB]", the frequency spacing $N_{DMRS\_Space}$ between DMRS ports, and other parameters used in each of the operation examples of the embodiments described above are merely examples and are not limited to these values.

Further, in each of the operation examples of the embodiments described above, the method for setting the frequency positions of PT-RSs does not need to be on a subcarrier-by-subcarrier basis but may be on an RB-by-RB basis. For example, the initial positions of PT-RSs may be expressed on an RB-by-RB basis, and the position of such an RB may be calculated and selected using a pseudo-random number function, various types of index, and the like. At this time, the spacings between RBs at which PT-RSs are mapped may be regular spacings or irregular spacings. Furthermore, a hopping offset may be set on an RB-by-RB basis, and this value may be calculated and selected using a pseudo-random number function, various types of index, and the like. In each RB onto which a PT-RS is mapped, a relative subcarrier position onto which the PT-RS is mapped may be a preset value, a value notified from a higher layer or the like, or a value calculated using a pseudo-random number function, various types of index, and the like.

Further, the present disclosure may be achieved with software, hardware, or software in cooperation with hardware. Each of the functional blocks used to describe the embodiments above may be partly or wholly achieved as an LSI, which is an integrated circuit, and each of the processes described in the embodiments above may be partly or wholly controlled by a single LSI or a combination of LSIs. The LSIs may each be composed of individual chips, or may be composed of a single chip so as to include some or all of the functional blocks. The LSIs may each include an input and an output for data. Depending on the degree of integration, the LSIs may alternatively be referred to as "ICs", "system LSIs", "super LSIs", or "ultra LSIs". However, the technique of implementing an integrated circuit is not limited to LSI and may be achieved by using a dedicated circuit, a general-purpose processor, or a dedicated processor. In addition, an FPGA (field-programmable gate array) that can be programmed after the manufacture of an LSI or a reconfigurable processor in which the connections and the settings of circuit cells disposed inside an LSI can be reconfigured may be used. The present disclosure may be achieved as digital processing or analog processing. If future integrated circuit technology replaces LSI as a result of the advancement of semiconductor technology or other derivative technology, the functional blocks could be integrated using the future integrated circuit technology. For example, biotechnology can also be applied.

A transmitter of the present disclosure includes an assignment circuit that maps a phase tracking reference signal onto a subcarrier and a transmitting circuit that transmits a signal containing the phase tracking reference signal. The phase tracking reference signal is mapped onto a different subcarrier for each cell, group, or mobile station.

In the transmitter of the present disclosure, the phase tracking reference signal is mapped onto a subcarrier determined by using either an index for identification of the cell, group, or mobile station or higher layer signaling.

In the transmitter of the present disclosure, the phase tracking reference signal is subjected to frequency hopping every unit time.

In the transmitter of the present disclosure, the phase tracking reference signal is subjected to a hopping offset determined by using either an index for identification of the cell, group, or mobile station or a time-domain index.

In the transmitter of the present disclosure, the time-domain index is a symbol number, a slot number, a minislot number, a subframe number, or a frame number.

In the transmitter of the present disclosure, a plurality of the hopping offsets against a plurality of the phase tracking reference signals that are transmitted from a plurality of antenna ports, respectively, are identical.

In the transmitter of the present disclosure, the assignment circuit maps, at regular spacings in a frequency domain, a plurality of the phase tracking reference signals transmitted at a given time.

In the transmitter of the present disclosure, the assignment circuit maps, at irregular spacings in a frequency domain, a plurality of the phase tracking reference signals transmitted at a given time.

In the transmitter of the present disclosure, the assignment circuit performs frequency hopping in a whole band assigned to the mobile station and maps the plurality of phase tracking reference signals onto any subcarriers within the band.

In the transmitter of the present disclosure, the mobile station is assigned a band divided into a plurality of partial bands, the assignment circuit maps any one of the plurality of phase tracking reference signals onto a corresponding one of the plurality of partial bands and performs frequency hopping on the phase tracking reference signal within the corresponding partial band.

In the transmitter of the present disclosure, in a case where there is coordination among cells, the assignment circuit maps, at regular spacings in a frequency domain, a plurality of the phase tracking reference signals that are transmitted at a given time and, in a case where there is no coordination among the cells, maps the plurality of phase tracking reference signals at irregular spacings in the frequency domain.

In the transmitter of the present disclosure, the assignment circuit maps the phase tracking reference signal onto any of subcarriers on which demodulating reference signals using a precoding which is identical to that used by the phase tracking reference signal are mapped.

A receiver of the present disclosure includes a receiving circuit that receives a signal containing a phase tracking reference signal and a demodulating circuit that demodulates a data signal by using a phase noise estimated value calculated using the phase tracking reference signal. The phase tracking reference signal is mapped onto a different subcarrier for each cell, group, or mobile station.

A transmission method of the present disclosure includes mapping a phase tracking reference signal onto a subcarrier and transmitting a signal containing the phase tracking reference signal. The phase tracking reference signal is mapped onto a different subcarrier for each cell, group, or mobile station.

A reception method of the present disclosure includes receiving a signal containing a phase tracking reference signal and demodulating a data signal by using a phase noise estimated value calculated using the phase tracking reference signal. The phase tracking reference signal is mapped onto a different subcarrier for each cell, group, or mobile station.

An embodiment of the present disclosure is useful to a mobile communication system.

REFERENCE SIGNS LIST

100 Transmitter
101 PT-RS generator
102, 203 Hopping pattern generator
103 Frequency hopper
104 Error correction coder
105 Modulator
106 Signal assigner
107 Transmitting unit
108, 201 Antenna
200 Receiver
202 Receiving unit
204 Signal demultiplexer
205 Channel estimator
206 CPE/ICI estimator
207 Data demodulator
208 Error correction decoder

The invention claimed is:

1. A reception apparatus comprising:
a receiver, which, in operation, receives, from a mobile station, a phase tracking reference signal mapped onto a subcarrier, which is selected by using an identification of the mobile station from among subcarriers on which a demodulation reference signal is mapped, a precoding applied to the demodulation reference signal being the same as a precoding applied to the phase tracking reference signal; and
circuitry, which, in operation, demodulates data using the phase tracking reference signal.

2. The reception apparatus according to claim 1, wherein the receiver, in operation, receives the phase tracking reference signal mapped onto a subcarrier determined by using either an identification of a cell or group, or higher layer signaling.

3. The reception apparatus according to claim 1, wherein the receiver, in operation, receives the phase tracking reference signal subjected to frequency hopping every unit time.

4. The reception apparatus according to claim 3, wherein the receiver, in operation, receives the phase tracking reference signal subjected to a hopping offset determined by using either an identification of a cell, group, or mobile station, or a time-domain index.

5. The reception apparatus according to claim 4, wherein the time-domain index is a symbol number, a slot number, a minislot number, a subframe number, or a frame number.

6. The reception apparatus according to claim 4, wherein a plurality of the hopping offsets against a plurality of the phase tracking reference signals that are transmitted from a plurality of antenna ports, respectively, are identical.

7. The reception apparatus according to claim 1, wherein the receiver, in operation, receives a plurality of the phase tracking reference signals that are mapped at regular spacings in a frequency domain and that are transmitted at a given time.

8. The reception apparatus according to claim 1, wherein the receiver, in operation, receives a plurality of the phase tracking reference signals that are mapped at irregular spacings in a frequency domain and that are transmitted at a given time.

9. The reception apparatus according to claim 8, wherein the receiver, in operation, receives the plurality of the phase tracking reference signals subjected to frequency hopping in a whole band assigned to the mobile station and that are mapped onto any subcarriers within the whole band.

10. The reception apparatus according to claim 8, wherein the mobile station is assigned a band divided into a plurality of partial bands, and the receiver, in operation, receives any one of the plurality of the phase tracking reference signals, which is mapped onto a corresponding one of the plurality of partial bands, the phase tracking reference signal being subjected to frequency hopping within the corresponding partial band.

11. The reception apparatus according to claim 1, wherein in a case where there is coordination among cells, the receiver, in operation, receives a plurality of the phase tracking reference signals that are mapped at regular spacings in a frequency domain and that are transmitted at a given time, in a case where there is no coordination among the cells, the receiver, in operation, receives a plurality of the phase tracking reference signals that are mapped at irregular spacings in the frequency domain.

12. The reception apparatus according to claim 1, wherein the receiver, in operation, receives the phase tracking reference signal mapped onto a different subcarrier for each cell, group, or mobile station.

13. A reception method comprising:
receiving, from a mobile station, a phase tracking reference signal mapped onto a subcarrier, which is selected by using an identification of the mobile station from among subcarriers on which a demodulation reference signal is mapped, a precoding applied to the demodulation reference signal being the same as a precoding applied to the phase tracking reference signal; and
demodulating data using the phase tracking reference signal.

* * * * *